US012180746B2

(12) United States Patent
Pardo et al.

(10) Patent No.: US 12,180,746 B2
(45) Date of Patent: Dec. 31, 2024

(54) STORAGE APPARATUS

(71) Applicant: Knoll, Inc., East Greenville, PA (US)

(72) Inventors: Benjamin A. Pardo, New York, NY (US); Masamichi Udagawa, New York, NY (US); Sigrid Moeslinger, New York, NY (US)

(73) Assignee: Knoll, Inc.

( * ) Notice: Subject to any disclaimer, the term of this patent is extended or adjusted under 35 U.S.C. 154(b) by 189 days.

(21) Appl. No.: 17/741,809

(22) Filed: May 11, 2022

(65) Prior Publication Data

US 2022/0364387 A1 Nov. 17, 2022

Related U.S. Application Data

(60) Provisional application No. 63/189,266, filed on May 17, 2021.

(51) Int. Cl.

| | |
|---|---|
| ***E05B 17/22*** | (2006.01) |
| ***E05B 17/10*** | (2006.01) |
| ***E05B 65/02*** | (2006.01) |
| ***E05G 1/08*** | (2006.01) |
| ***E05G 1/10*** | (2006.01) |

(52) U.S. Cl.

CPC ............ *E05B 17/226* (2013.01); *E05B 17/10* (2013.01); *E05B 65/025* (2013.01); *E05G 1/08* (2013.01); *E05G 1/10* (2013.01)

(58) Field of Classification Search

CPC ...... E05B 17/226; E05B 17/10; E05B 65/025; E05G 1/08; E05G 1/10

See application file for complete search history.

(56) References Cited

U.S. PATENT DOCUMENTS 5,894,277 A * 4/1999 Keskin ............... G07C 9/00896 235/382
6,260,392 B1 * 7/2001 Geiger ................ E05B 47/0607 70/276

(Continued)

FOREIGN PATENT DOCUMENTS

CN 105064789 B 4/2018
CN 207594903 U * 7/2018

(Continued)

*Primary Examiner* — Chico A Foxx
(74) *Attorney, Agent, or Firm* — The Belles Group, P.C.

(57) ABSTRACT

A storage apparatus having a keyless lock/unlock system. The storage apparatus may including a housing having a storage cavity and a door may be coupled to the housing. A handle is coupled to the door and defines a handle cavity. The locking system includes an electronics assembly and a locking mechanism that are in operable communication. The electronics assembly includes a reader component and an indicator component that are located within the handle cavity. The indicator component is visible through a window in the handle. When the reader component receives credential data which is then authenticated, the locking system transitions between a locked configuration whereby the locking mechanism is locked and the indicator component is in a first display state and an unlocked configuration whereby the locking mechanism is unlocked and the indicator component is in a second display state. The indicator component may be electronic paper.

13 Claims, 24 Drawing Sheets

(56) References Cited

U.S. PATENT DOCUMENTS

| | | | | |
|---|---|---|---|---|
| 6,304,168 | B1 | 10/2001 | Ohta et al. | |
| 6,799,434 | B1* | 10/2004 | Hobbs, Jr. | F25D 29/00 62/530 |
| 7,548,210 | B2 | 6/2009 | Hashiguchi et al. | |
| 9,249,606 | B2 | 2/2016 | Naka | |
| 10,049,520 | B2 | 8/2018 | Gardiner et al. | |
| 10,549,683 | B1* | 2/2020 | Salter | B60Q 1/323 |
| 11,615,667 | B2* | 3/2023 | Gokcebay | G07C 9/00944 232/24 |
| 2002/0141801 | A1* | 10/2002 | Shimoda | B41J 3/4076 400/70 |
| 2003/0063037 | A1* | 4/2003 | March | H01Q 1/3241 343/873 |
| 2007/0024954 | A1* | 2/2007 | Sakamoto | G02F 1/16757 359/296 |
| 2009/0249846 | A1* | 10/2009 | Gokcebay | G07C 9/00944 70/279.1 |
| 2010/0253519 | A1* | 10/2010 | Brackmann | B60P 3/03 340/572.1 |
| 2012/0169072 | A1* | 7/2012 | Maguire | G07C 9/00912 292/336.3 |
| 2013/0342314 | A1* | 12/2013 | Chen | G07C 9/00309 340/5.65 |
| 2014/0316612 | A1* | 10/2014 | Banter | B60R 25/01 701/2 |
| 2014/0318198 | A1* | 10/2014 | Gokcebay | E05B 65/46 70/278.1 |
| 2015/0211253 | A1* | 7/2015 | Shah | E05B 45/06 292/336.3 |
| 2015/0211258 | A1* | 7/2015 | Gokcebay | E05C 1/04 70/278.1 |
| 2015/0233154 | A1* | 8/2015 | Smart | E05B 85/107 70/237 |
| 2015/0356914 | A1* | 12/2015 | Aoyama | H10K 59/10 345/690 |
| 2016/0258188 | A1* | 9/2016 | Vandewall | E05C 1/10 |
| 2017/0254116 | A1 | 9/2017 | Grant et al. | |
| 2017/0356218 | A1* | 12/2017 | Beasley | A47B 97/00 |
| 2017/0362860 | A1* | 12/2017 | Salter | B60Q 1/0017 |
| 2018/0160835 | A1* | 6/2018 | Garrity | E05B 47/0001 |
| 2018/0315265 | A1* | 11/2018 | Zabala Zabaleta | G07C 9/00912 |
| 2019/0213540 | A1* | 7/2019 | Petroski | G06Q 10/0837 |
| 2021/0104108 | A1* | 4/2021 | Cartwright | G07C 9/00563 |
| 2021/0235891 | A1* | 8/2021 | Derosa | G06Q 20/326 |
| 2022/0005141 | A1* | 1/2022 | Ito | B60R 25/01 |
| 2022/0008578 | A1* | 1/2022 | Raphael | A47G 29/141 |
| 2022/0051513 | A1* | 2/2022 | Schmidt | G07C 9/00571 |
| 2022/0051515 | A1* | 2/2022 | Schmidt | G07C 9/00944 |
| 2022/0410709 | A1* | 12/2022 | Florentz | B60K 37/10 |

FOREIGN PATENT DOCUMENTS

| | | | | |
|---|---|---|---|---|
| CN | 108550217 | A | | 9/2018 |
| CN | 209350726 | U | | 9/2019 |
| CN | 209447238 | U | | 9/2019 |
| CN | 210152439 | U | | 3/2020 |
| CN | 111710965 | A | | 9/2020 |
| CN | 212249510 | U | | 12/2020 |
| CN | 216043103 | U | * | 3/2022 |
| CN | 219773877 | U | * | 9/2023 |
| DE | 102014104235 | A1 | | 10/2015 |
| EP | 0970859 | A2 | * | 1/2000 |
| EP | 1840845 | B1 | | 2/2012 |
| JP | 2001345615 | A | | 12/2001 |
| JP | 4962810 | B2 | | 6/2012 |
| JP | 5109172 | B2 | | 12/2012 |
| KR | 100954519 | B1 | | 4/2010 |
| KR | 101160629 | B1 | * | 6/2012 |
| KR | 101490583 | B1 | | 1/2015 |
| KR | 101692993 | B1 | | 12/2016 |
| WO | 9641486 | | | 12/1996 |
| WO | 2009026599 | A1 | | 3/2009 |
| WO | 2018224205 | A1 | | 12/2018 |

* cited by examiner

STORAGE APPARATUS

CROSS-REFERENCE TO RELATED APPLICATIONS

The present application claims priority to U.S. Provisional Patent Application Ser. No. 63/189,266, filed May 17, 2021, the entirety of which is incorporated herein by reference.

BACKGROUND

In storage systems which include a keyless lock, there are several competing factors to consider. In the case of a storage apparatus which is formed from a non-conductive material, the reader or antenna which receives the credential information from a keycard or smart phone or the like may be located on the rear of the door which is not visible to a user. However, this cannot be done with a storage apparatus formed from a conductive material due to the material interfering with the operation of the reader or antenna. In situations where the storage apparatus is formed from a conductive material, the antenna must be mounted on the front face of the storage apparatus, which creates a less than desirable aesthetic. Furthermore, in some situations there is a desirability to provide an indication as to the status of the lock. For example, in a locker room setting, it is advantageous for a user to be able to readily determine which lockers are in a locked state and therefore in use. However, currently existing indicators are not sufficiently reliable and may draw excessive power from a power source which can lead to inefficiencies and a need to replace the power source on a frequent basis. Thus, a need exists for a new keyless lock system that is aesthetically pleasing, easy to use, and capable of installation on various types of storage apparatus and other lockable structures.

BRIEF SUMMARY

The present invention is directed to a storage apparatus having a keyless lock/unlock system. The storage apparatus may including a housing having a storage cavity and a door may be coupled to the housing. A handle is coupled to the door and defines a handle cavity. The locking system includes an electronics assembly and a locking mechanism that are in operable communication. The electronics assembly includes a reader component and an indicator component that are located within the handle cavity. The indicator component is visible through a window in the handle. When the reader component receives credential data which is then authenticated, the locking system transitions between a locked configuration whereby the locking mechanism is locked and the indicator component is in a first display state and an unlocked configuration whereby the locking mechanism is unlocked and the indicator component is in a second display state.

In one aspect, the invention may be a storage apparatus comprising: a housing comprising a storage cavity having an opening; a door coupled to the housing and alterable between a closed state whereby the door closes the opening of the storage cavity and an open state whereby the opening of the storage cavity is exposed to provide a user with access into the storage cavity; a handle coupled to the door and configured for engagement with a user's hand to facilitate opening and closing of the door, the handle comprising a handle cavity and a window providing visual access into the handle cavity; a locking system comprising: an electronics assembly comprising a reader component and an indicator component that are located within the handle cavity, the indicator component being visible through the window of the handle and being alterable between a first display state and a second display state; and a locking mechanism in operable communication with the electronics assembly, the locking mechanism alterable between a locked state whereby the door is prevented from being altered from the closed state to the open state and an unlocked state whereby the door is permitted to be altered between the open and closed states; wherein upon the reader component receiving credential data and the electronics assembly authenticating the credential data, the locking system is transitioned between: (1) a locked configuration whereby the locking mechanism is in the locked state and the indicator component is in the first display state; and (2) an unlocked configuration whereby the locking mechanism is in the unlocked state and the indicator component is in the second display state.

In another aspect, the invention may be a storage apparatus comprising: a housing comprising a storage cavity having an open end; a door coupled to the housing and configured to close the open end of the storage cavity; a handle coupled to the door in a fixed manner such that the handle is non-movable relative to the door, the handle comprising a handle cavity; an electronics assembly comprising: a power source; a reader component located within the handle cavity and configured to receive credential data; a visual indicator component configured to switch between a first display state and a second display state each time power is supplied from the power source to the visual indicator component; and a controller operably coupled to each of the reader component, the visual indicator component, and the power source; a locking mechanism operably coupled to the electronics assembly and alterable between a locked state and an unlocked state; wherein upon the electronics assembly receiving and authenticating the credential data, the controller causes power to be supplied from the power source to each of the locking mechanism and the indicator component to either: (1) alter the locking mechanism from the locked state to the unlocked state and alter the visual indicator component from the first display state to the second display state; or (2) alter the locking mechanism from the unlocked state to the locked state and alter the visual indicator component from the second display state to the first display state.

In yet another aspect, the invention may be a storage apparatus comprising: a housing comprising a plurality of storage cavities each having an opening; a plurality of doors coupled to the housing, each of the doors alterable between a closed state whereby the door closes the opening of one of the storage cavities and an open state whereby the opening of the one of the storage cavities is exposed to provide a user with access into the one of the storage cavities; a plurality of handles, each of the handles coupled to one of the doors and defining a handle cavity; a locking system associated with each of the plurality of doors, the locking system comprising: an electronics assembly comprising a reader component and an indicator component that are located within the handle cavity, the indicator component being visible through the window of the handle and being alterable between a first display state and a second display state; and a locking mechanism in operable communication with the electronics assembly, the locking mechanism alterable between a locked state whereby the door is prevented from being altered from the closed state to the open state and an unlocked state whereby the door is permitted to be altered between the open and closed states; wherein upon the reader component receiving credential data and the electronics assembly authenticating the credential data, the locking system is transitioned between: (1) a locked configuration whereby the locking mechanism is in the locked state and the indicator component is in the first display state; and (2) an unlocked configuration whereby the locking mechanism is in the unlocked state and the indicator component is in the second display state.

In still another aspect, the invention may be a storage apparatus comprising: a housing comprising a storage cavity; a door coupled to the housing to close the storage cavity; a handle coupled to the door and configured for engagement with a user's hand to facilitate opening and closing of the door, the handle comprising a handle cavity and a window providing visual access into the handle cavity; a power supply; a reader component located within the handle cavity and configured to receive credential data; an indicator component located within the handle cavity and visible through a window of the handle to provide a visual indication of a use state of the storage apparatus to a user or a potential user of the storage apparatus, the indicator component being electronic paper that transitions between a first display state and a second display state each time power from the power supply is transmitted to the indicator component, the indicator component maintaining the first and second display states between each transmission of power to the indicator component; a locking mechanism alterable between a locked state and an unlocked state each time power from the power supply is transmitted to the locking mechanism, the locking mechanism maintaining the locked and unlocked state between each transmission of power to the locking mechanism; wherein upon the reader component receiving the credential data and the credential data being authenticated, power from the power source is transmitted to the locking mechanism and to the indicator component and either: (1) the locking mechanism is altered from the locked state to the unlocked state and the indicator component is altered from the first display state to the second display state; or (2) the locking mechanism is altered from the unlocked state to the locked state and the indicator component is altered from the second display state to the first display state.

In a further aspect, the invention may be a storage apparatus comprising: a housing comprising a storage cavity; a door coupled to the housing and configured to close the storage cavity, the door comprising a plurality of apertures that extend from a front surface thereof to a rear surface thereof; a handle comprising a front surface, a rear surface, a plurality of connection legs protruding from the rear surface, and a lightpipe leg protruding from the rear surface, the lightpipe leg defining a passageway that extends from a distal end of the lightpipe leg to an opening in the front surface of the handle, each of the plurality of connection legs and the lightpipe leg extending into one of the plurality of apertures in the door to facilitate coupling the handle to the door; a locking mechanism comprising a first component coupled to the rear surface of the door and a second component coupled to a sidewall of the housing within the storage cavity, the first component comprising a housing and an illumination element located within the housing, the illumination element aligned with the passageway of the lightpipe leg of the handle, the locking mechanism alterable between a locked state whereby a first locking feature of the first component engages a second locking feature of the second component and an unlocked state whereby the first and second locking features are not engaged; a reader component configured to receive credential data; and wherein upon the reader component receiving credential data and the credential data being authenticated, the illumination element flashes one or more times within a predetermined time period and the locking mechanism is either altered from the locked state to the unlocked state or from the unlocked state to the locked state.

In a still further aspect, the invention may be a storage apparatus comprising: a housing comprising a storage cavity; a door coupled to the housing and alterable between a closed state and an open state; a handle coupled to the door and configured for engagement with a user's hand to facilitate opening and closing of the door, the handle comprising a handle cavity, and the handle being non-movable relative to the door; a locking system comprising: an electronics assembly comprising a reader component located within the handle cavity; and a locking mechanism in operable communication with the electronics assembly, the locking mechanism alterable between a locked state whereby the door is prevented from being altered from the closed state to the open state and an unlocked state whereby the door is permitted to be altered between the open and closed states; and wherein upon the reader component receiving credential data and the electronics assembly authenticating the credential data, the locking mechanism is transitioned between the locked state and the unlocked state.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1:
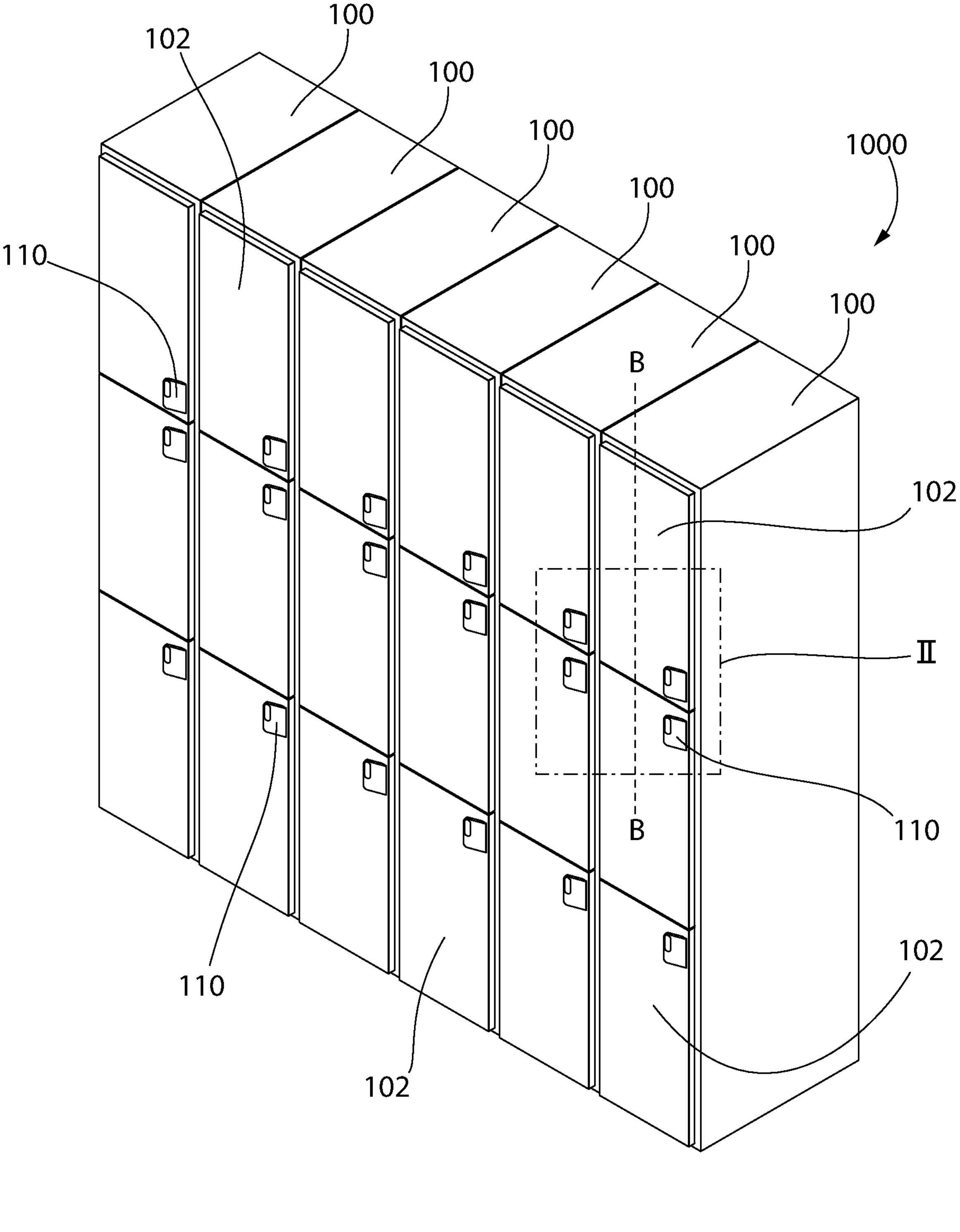
FIG. 1 is a front perspective view of a storage apparatus in accordance with an embodiment of the present invention.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Figure 2:
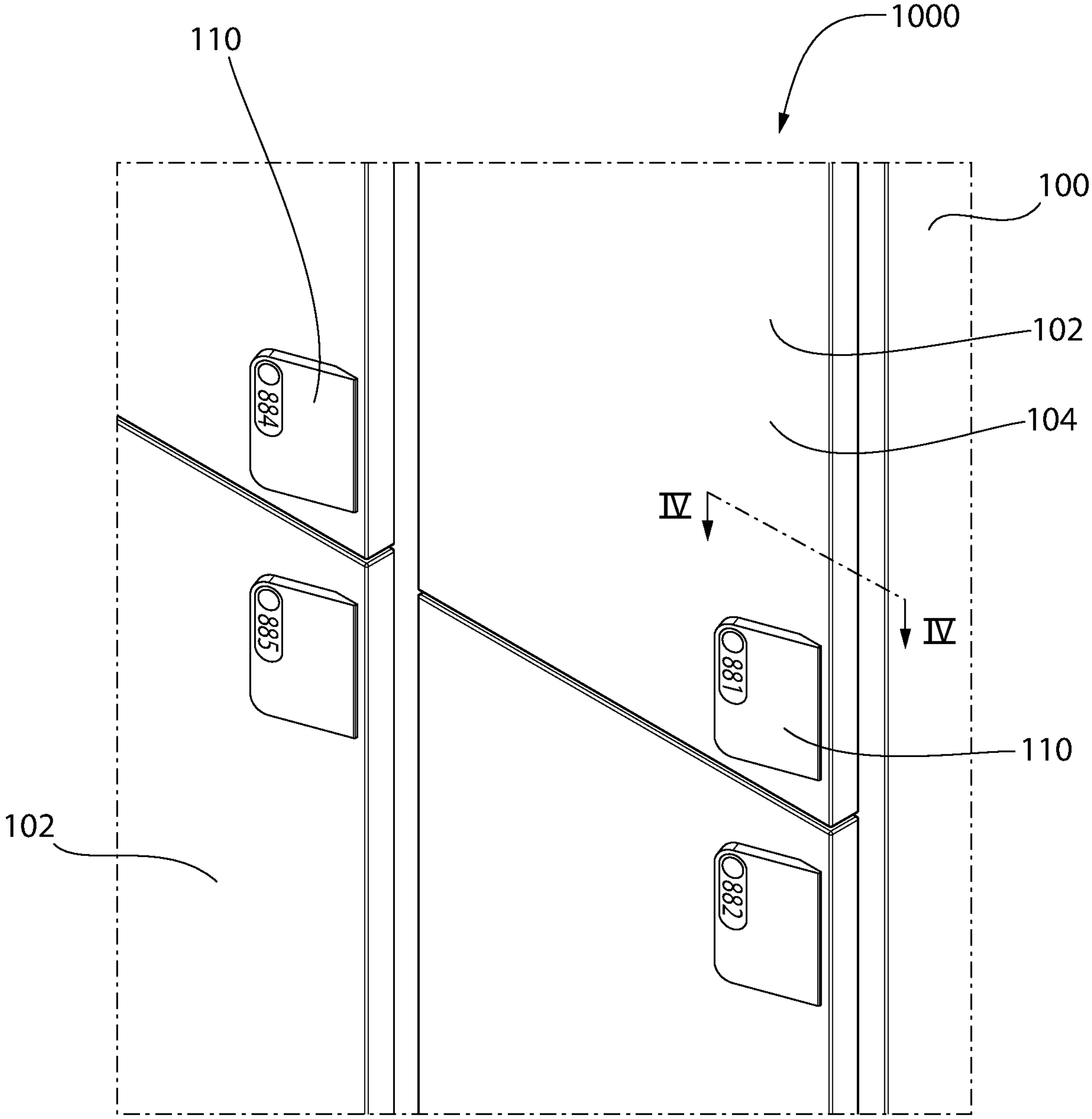
FIG. 2 is a close-up view of area II of FIG. 1.

Referring to FIGS. 1 and 2, a storage apparatus 1000 is illustrated in accordance with an embodiment of the present invention. In the exemplified embodiment, the storage apparatus 1000 is a set of lockers that includes a plurality of storage cavities each of which is closed by a door. However, the invention is not limited to the use of the technology described herein in a locker setting. Rather, the invention may be used for lockers, pedestals, credenzas, doublewides (for example a cabinet with drawers), a desk with drawers, a dresser, medicine cabinets, tower storage units, file cabinets, and other types of cabinets or storage devices that can be closed and locked. Moreover, the technology described herein could also be used on a door in a building such as a home or office to facilitate the locking and unlocking of that door. In still other embodiments, the technologies described herein could be used on a refrigerator or virtually any other object or product which has a door that can be locked. Thus, as used herein, the term storage apparatus should be interpreted quite broadly as any structure that is configured to store items and includes a door or drawer that can be locked to prevent access to the items stored therein. Moreover, the technology described herein is also applicable to doors which permit a user access into a building or into a particular area of a building.

In the exemplified embodiment, the storage apparatus 1000 comprises a housing 100 having a plurality of storage cavities 101. In FIG. 1, each housing 100 defines three distinct storage cavities 101 that are in a vertically stacked arrangement, and a plurality of the housings 100 are positioned side-by-side to form the storage apparatus 1000. This is the scenario which might exist in a locker room setting whereby each of the storage cavities 101 forms part of a locker. However, as mentioned above, the technologies described herein may also be used on cabinets or other types of storage apparatuses, including apparatuses which have only a single storage cavity. Thus, the storage apparatus 1000 is merely one exemplary embodiment of the present invention. Only one of the storage cavities 101 is visible in FIG. 3, because the others are closed by doors which will be described below. However, the storage cavities 101 are all generally the same, although they could have different dimensions and/or volumes in some embodiments. That is, each of the storage cavities 101 is defined by a plurality of interior walls which define the shape of the storage cavity 101. While the storage cavities 101 are square or rectangular in shape in the exemplified embodiment, they could take on any other shape in other embodiments. There may be shelves or other structures located within the storage cavities 101 in some embodiments.

As mentioned above, in the exemplified embodiment the storage apparatus 1000 comprises a plurality of doors 102 such that each of the doors 102 closes one of the storage cavities 101. Only some of the doors 102 are labeled in the drawings to avoid redundancy. In this particular embodiment, each of the doors 102 is coupled to the housing 100 by a hinge so that the doors 102 can be pivoted between a closed state and an open state. Of course, other styles of doors may be used, including doors that slide rather than pivot between the open and closed states. Moreover, while the doors 102 pivot about a vertical axis in the exemplified embodiment, the doors 102 may pivot about a horizontal axis or an axis that is oblique to the vertical/horizontal axes in other embodiments. This has no effect on the invention described herein. The door 102 is merely any closure member which can be closed to block access to the storage cavity 101 and which can be locked to prohibit the door from being altered from the closed state to the open state to prevent unauthorized access to the storage cavity 101, as described further herein. Each of the doors 102 has an inner or rear surface 103 which faces the storage cavity 101 and an outer or front surface 104 which faces outward towards a user.

On each of the doors 102, there is a handle 110. While the details of the handle 110 will be provided further below, a brief description of the handle 110 will be provided here. The handle 110 provides a user with a structure that can be gripped or held for purposes of opening and closing the door 102. Thus, each of the handles 110 is coupled to one of the doors 102. Moreover, in the exemplified embodiment the handles 110 are fixed to the doors 102 such that the handles 110 are non-movable relative to the door 102 to which it is attached. Thus, the handles 110 are not rotated or pivoted to facilitate the unlatching and opening of the door 102. Rather, a user simply pulls on the handle 110 to open the door 102.

The door 102 may be affixed to the housing 100 with a biasing member such as a spring so that the door 102 biases into the closed state, and is only opened when a user pulls on the handle 110. In other embodiments, the door 102 may need to be forcefully altered into both of the open and closed states and may not be spring biased in any direction. In any case, the handle 110 is fixedly and non-movably coupled to the door 102 to which it is attached. In the exemplified embodiment, the handle 110 includes a label with a number that is associated with a particular storage cavity 101 of the storage apparatus 1000. Again, this is common in locker room settings where there are a plurality of labeled lockers each with a distinct number. This assists a user in remembering which locker he or she used to store his or her items. In can also be useful in other settings, such as a police department storing evidence, an office storing confidential files, or the like. As mentioned above, additional details of the handle 110 will be provided below.

Figure 3:
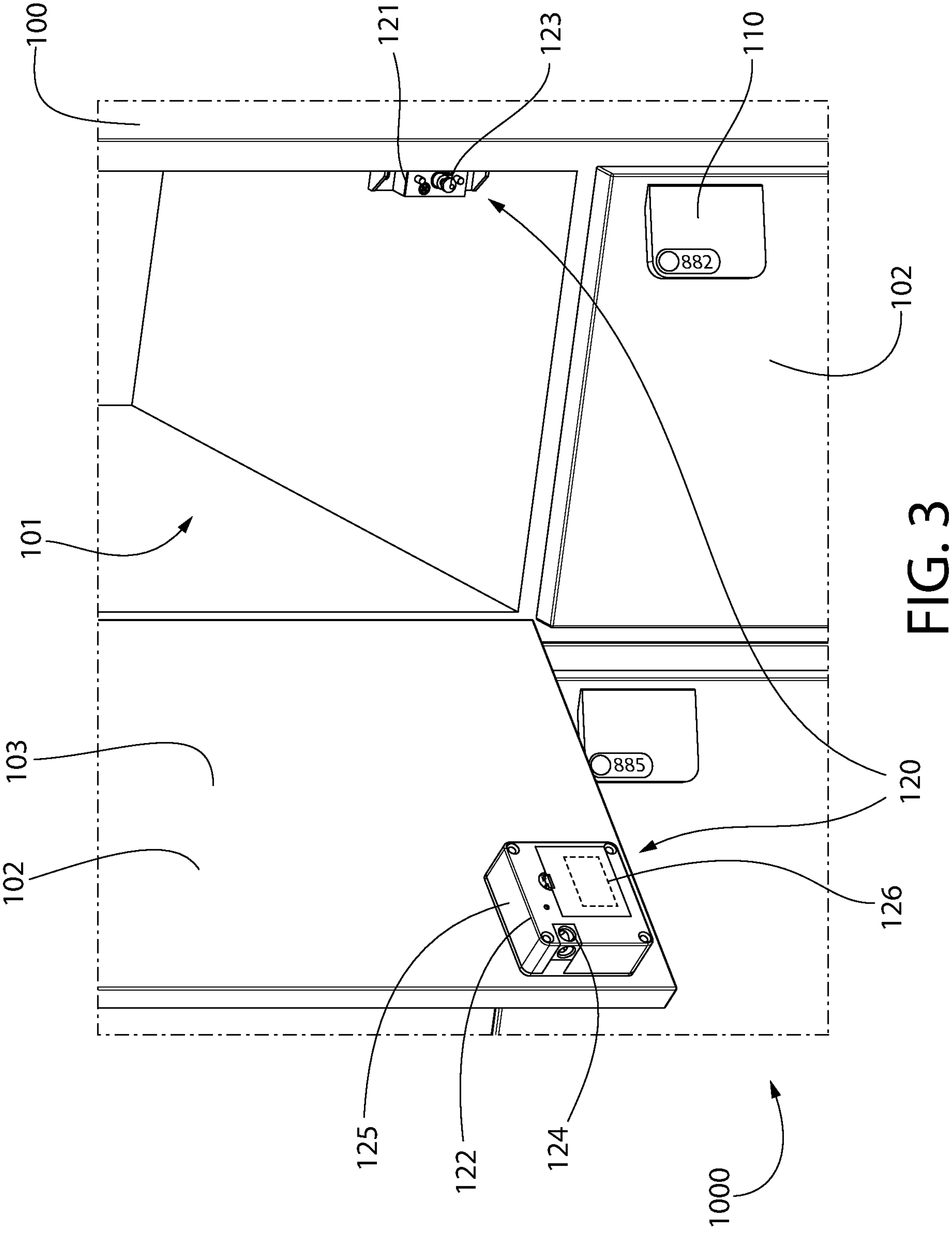
FIG. 3 is the close-up view of FIG. 2 with a door in an open state.

Referring to FIG. 3, the storage apparatus 1000 also comprises a locking mechanism 120 associated with each of the storage cavities 101 to facilitate the locking of the door 110 associated with that storage cavity 101 in the closed state. As discussed below, the storage apparatus 1000, or each door thereof, is configured to be locked and unlocked in a keyless manner, such as by using a credential device such as a keycard, a smart phone, a dedicated electronic key device, or the like. The locking mechanism 120 of the storage apparatus 1000 could alternatively be altered between locked and unlocked states using a keypad, fingerprint scanner, optical scanner, facial recognition, or other techniques. Such keyless lock technologies are well known and therefore will not be described in great detail herein except to the extent that it pertains to the invention being disclosed.

In the exemplified embodiment, there is a dedicated locking mechanism 120 associated with each of the storage cavities 101 of the storage apparatus 1000. Thus, in the exemplified embodiment the storage apparatus 1000 comprises eighteen of the storage cavities 101, and thus there are also eighteen distinct locking mechanisms 120. In other embodiments, a single locking mechanism 120 may be associated with more than one of the storage cavities 101 to lock and unlock those storage cavities 101 simultaneously.

In the exemplified embodiment, the locking mechanism 120 (or each locking mechanism) generally comprises a first lock component 121 that is coupled to an interior wall of the housing 100 within each of the storage cavities 101 and a second lock component 122 that is coupled to the rear surface 103 of the door 102. The first lock component 121 comprises a first locking feature 123 which in the exemplified embodiment is a protrusion. The second lock component 122 comprises a second locking feature 124 which in the exemplified embodiment is a port. When the lock mechanism 120 is in the locked state, the protrusion of the first locking feature 123 engages or nests within the port of the second locking feature 124 to lock the door 102 in the closed state and prevent the door 102 from being altered from the closed state to the open state. When the lock mechanism 120 is in the unlocked state, the first and second locking features 123, 124 are not in engagement with one another, which renders the door 102 able to freely move between the open and closed states.

In some embodiments, the first locking feature 123 may move inwardly and outwardly to alter the locking mechanism 120 between the locked and unlocked states. Of course, other locking mechanisms which achieve a similar result can also be used. Specifically, in the exemplified embodiment the locking mechanism 120 uses a bolt head which is captured into a port to lock the door 102. In other embodiments, the locking mechanism 120 may use rotating arms that interact with one another to achieve the locked state. In still other embodiments, the locking mechanism may involve a bolt protruding from and being retracted into the door 102, with the bolt nesting within a recess or cavity formed directly into the housing 100 when in the locked state. Thus, variations with regard to the specific details of the locking mechanism 120 are possible and may fall within the scope of the invention described herein. The exact type and style of locking mechanism used is not intended to be limiting of the invention described herein unless specifically claimed as such.

In the exemplified embodiment, the second lock component 122 comprises an actuator housing 125 which comprises the second locking feature 124. Furthermore, the actuator housing 125 may contain a power source 126 which intermittently supplies power to the locking mechanism 120 for purposes of altering the locking mechanism 120 between the locked and unlocked states. The power source 126 may be one or more batteries and is illustrated generically in FIG. 3. This same power source 126 may also be used to supply power intermittently to an indicator component. As described in more detail below with specific reference to FIG. 7, the locking mechanism 120 may form part of a locking system or an access system, such as a keyless locking system. In some embodiments, the locking system may comprise a controller or processor which receives data from and transmits data or instructions to various other components of the locking system. Thus, for example, the controller may receive data from an antenna or other type of reader device so that the controller can determine if the data is authenticated. If so, the controller may instruct the locking mechanism 120 to alter from the locked state to the unlocked state or vice versa, and may also instruct an indicator component to transition to indicate either a use status or a non-use status of the storage cavity 101. The controller may be located within the actuator housing 125 of the second lock component 122.

Figure 4A:
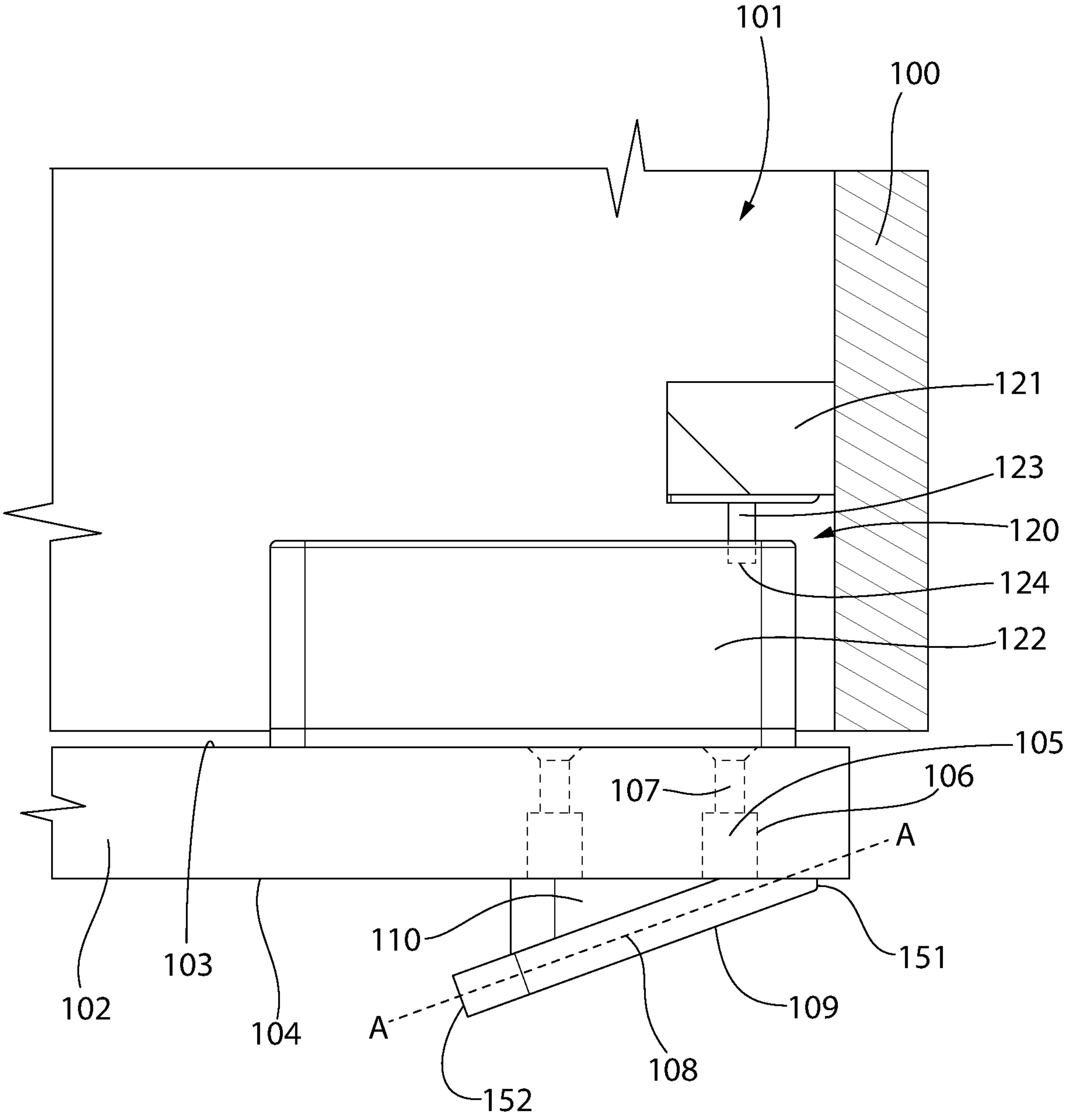
FIGS. 4A and 4B are cross-sectional views taken along line IV-IV of FIG. 2, with FIG. 4A illustrating a locking mechanism of the storage apparatus in a locked state and FIG. 4B illustrating the locking mechanism in an unlocked state.
Figure 4B:
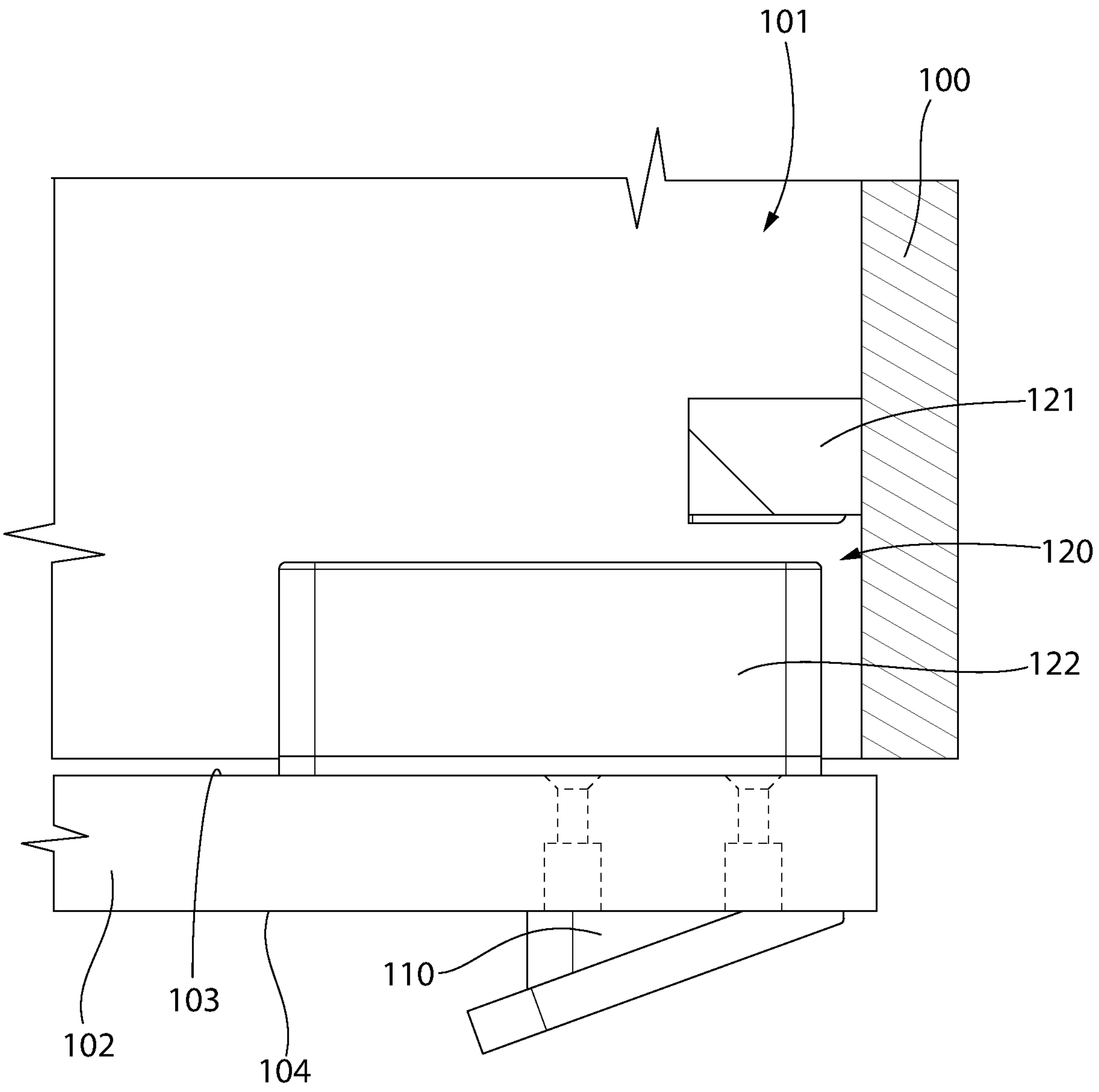

Referring to FIGS. 4A and 4B, a cross-sectional view taken through a part of the housing 100 associated with one of the storage cavities 101 is illustrated. These views illustrate the door 102 in a closed state, and also illustrate the locking mechanism 120 in a locked state (FIG. 4A) and in an unlocked state (FIG. 4B). In particular, in FIG. 4A, the first locking feature 123 of the first lock component 121 is engaged with the second locking feature 124 of the second lock component 122 to lock the door 102 in the closed state. Specifically, the first locking feature 123 is at least partially nested within the port defined by the second locking feature 124 and the first locking feature 123 is locked therein. The second lock component 122 may include internal features which lock to the first locking feature 123 and prevent its ready removal from the second locking feature 124 to prevent the door 102 from being opened when the first and second locking features 122, 124 are engaged with one another. In FIG. 4B, the first locking feature 123 has been retracted out of the second locking feature 124 thereby unlocking the locking mechanism 120 and permitting a user to readily and freely alter the door 102 from the closed state as shown in FIGS. 4A and 4B to an open state so that a user can insert items into the storage cavity 101 or access items already positioned thereon. Of course, as mentioned above, different locking mechanisms may be used in other embodiments so long as they can be altered between locked and unlocked states.

FIGS. 4A and 4B also provide views that depict the manner of attaching of the handle 110 to the door 102. Briefly, the handle 110 includes connection protrusions (or connection legs or more generically coupling elements) 105 that extend into openings 106 in the door 102. The openings 106 in the door 102 extend fully through the thickness of the door 102 from the front surface 104 to the rear surface 103. The handle 110 is then connected to the second lock component 122 via intermediate attachment members 107. It should be appreciated that other techniques for connecting the handle 110 to the door 102 may be used. However, the handle 110 is preferably coupled to the door 102 is a fixed and non-movable manner such that the handle 110 does not move relative to the door 102 once coupled thereto. Rather, the handle 110 provides a gripping surface for a user to open and close the door 102, but the handle 110 is not pivoted or rotated to unlatch the door 102.

In the exemplified embodiment, the handle 110 comprises a gripping portion 108 having a front surface 109. The gripping portion 108 extends from a first end 151 to a second end 152 along a handle axis A-A. Moreover, as shown in FIG. 1, the door 102 extends along a longitudinal axis B-B. The handle axis A-A is oriented obliquely relative to the longitudinal axis B-B of the door 102. That is, the gripping portion 108 and the front surface 109 of the handle 110 are oriented obliquely relative to the door 102, and particularly relative to the front surface 104 of the door 102. The first end 151 of the gripping portion 108 is located adjacent to or in abutting contact with the front surface 104 of the door 102 and the second end 152 of the gripping portion 108 is spaced apart from the front surface 104 of the door 102 such that the second end 152 of the handle 110 is located further from the door 102 than the first end 151 of the handle 110. To alter the door from the closed state to the open state, a user can insert his or her fingers between an underside of the gripping portion 108 of the handle 110 and the front surface 104 of the door 102 at a location that is adjacent to the second end 152 of the gripping portion 108 due to the spacing between the handle 110 and the door 102 at that location.

Figure 5A:
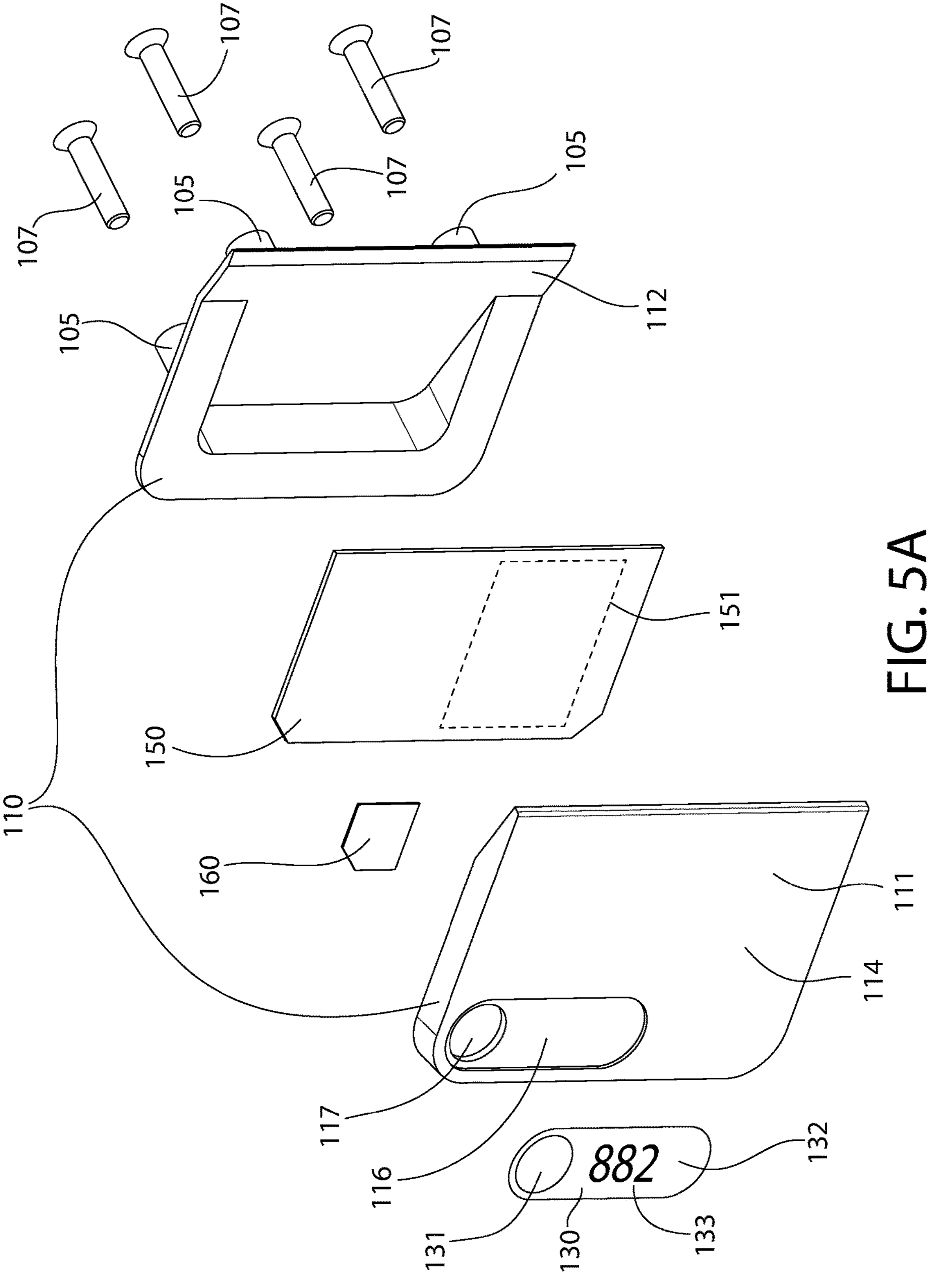
FIGS. 5A and 5B are front and rear perspective and exploded views of a handle of the storage apparatus of FIG. 1.
Figure 5B:
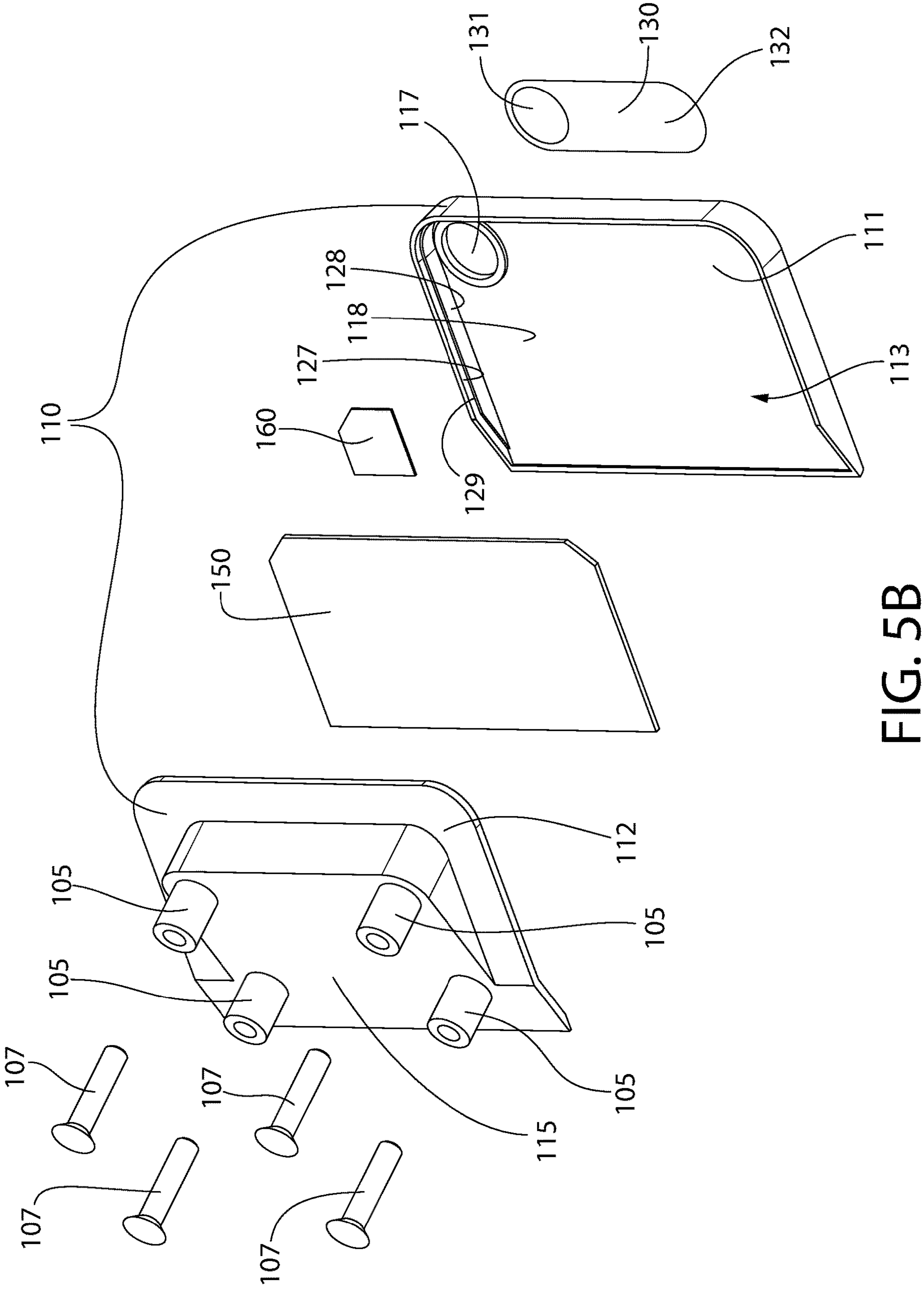
Figure 6:
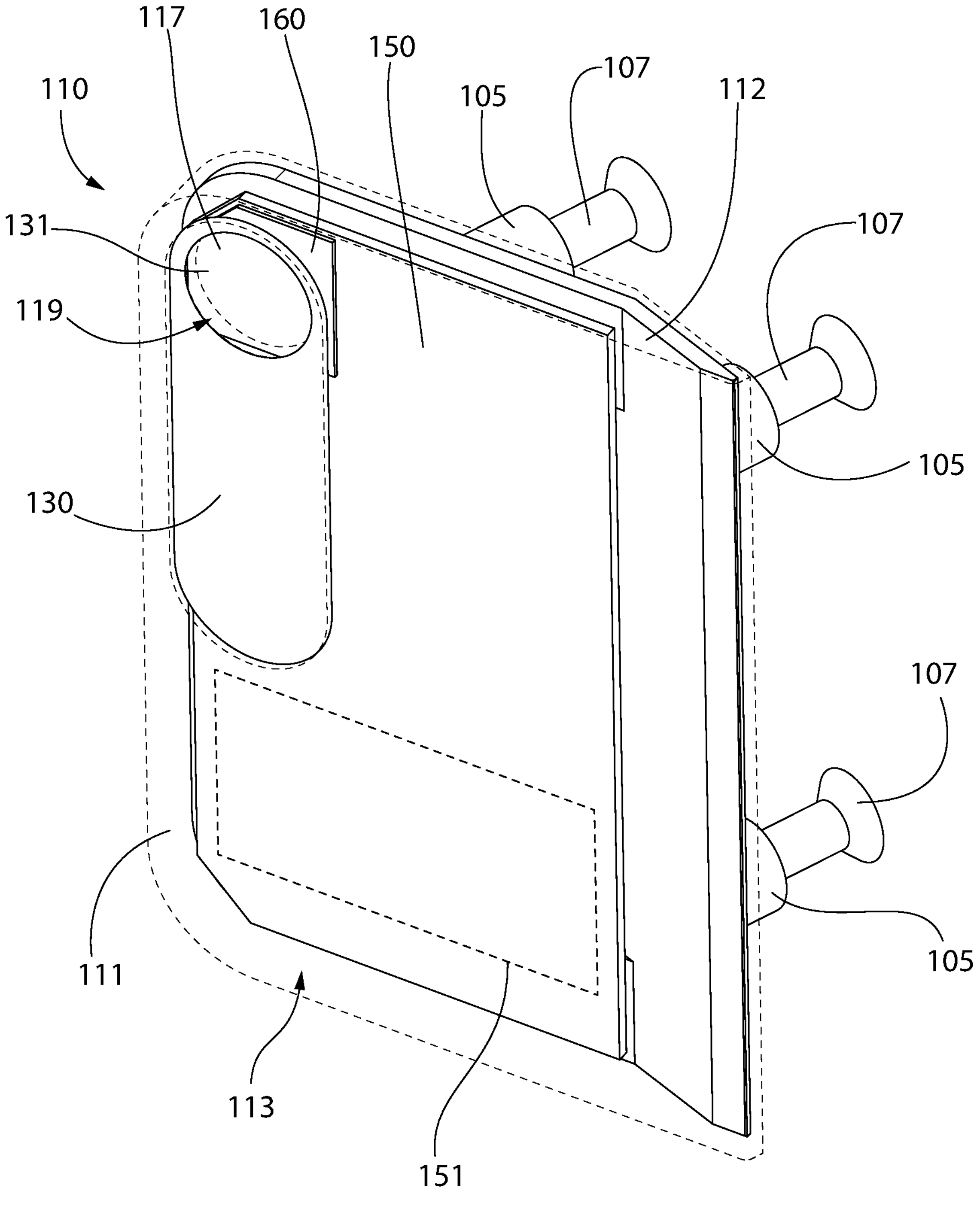
FIG. 6 is a perspective view of the handle with a portion thereof shown in ghost lines to make interior components visible.

Referring to FIGS. 5A, 5B, and 6 concurrently, the handle 110 and the components that are contained within an interior of the handle 110 will be described. The handle 110 comprises a first handle component 111 and a second handle component 112 that are coupled together to form the handle 110. The first and second handle components 111, 112 may be detachably coupled together via a press or friction fit or a snap-fit arrangement. Alternatively, the first and second handle components 111, 112 may be coupled together and thermally welded to create a permanent attachment between the first and second handle components 111, 112. In still other embodiments, fasteners such as screws or other articles of hardware may be used to facilitate the attachment between the first and second handle components 111, 112. A detachable connection may be preferable in some embodiments because there are items contained between the first and second handle components 111, 112 and thus to provide someone with access to those items it may be desirable to allow for the first and second handle components 111, 112 to be detached from one another. However, the first and second handle components 111, 112 should be sufficiently coupled so that a user does not detach the first and second handle components 111, 112 from one another during normal use of the handle 110 to open and/or close the door 102.

The handle 110 comprises a handle cavity 113 which is defined by the space between the first and second handle components 111, 112 when the first and second handle components 111, 112 are attached. FIG. 6 illustrates the first handle component 111 in dotted lines or ghost lines so that the handle cavity 113 and the components held therein can be seen. In reality, the first and second components 111, 112 of the handle 110 are predominantly solid and oblique so that the components held therein are not visible, with the exception of the indicator component as described below. In the exemplified embodiment, the first handle component 111 defines the handle cavity 113 and a portion of the second handle component 112 nests within a portion of the handle cavity 113 when the first and second handle components 111, 112 are attached. However, the invention is not to be so limited and the handle cavity 113 may be defined by the second handle component 112 or by a combination of the first and second handle components 111, 112 in other embodiments.

In the exemplified embodiment, the first handle component 111 comprises an inner surface 127 that defines the handle cavity 113 and a stopper wall 128 that protrudes from the inner surface 127. An upper surface 129 of the stopper wall 128 forms a ledge against which the second handle component 112 abuts when the first and second handle components 111, 112 are coupled together. This ensures that the space between the upper surface 129 of the stopper wall 128 and a rear surface 118 of the first handle component is empty and available for the insertion and holding of additional components as described herein. That is, the second handle component 112 will not pass into this region even when coupled to the first handle component 111 due to the stopper wall 128.

The handle 110 comprises a front surface 114 which is formed by the first handle component 111 and a rear surface 115 which is formed by the second handle component 112. As noted previously, the handle 110 comprises the plurality of connection protrusions 105, which protrude from the rear surface 115. Thus, the connection protrusions 105 are formed as a part of the second handle component 112. The connection protrusions 105 are cylindrical structures which define interior channels that are configured to receive the intermediate attachment members 107 to facilitate the coupling of the handle 110 to the door 102 and/or to the locking mechanism 120 as described above. That is, as noted above, the connection protrusions 105 extend into the openings 106 in the door 102 from the front surface 104 of the door 102 and the intermediate attachment members 107 extend into the openings 106 in the door 102 from the rear surface 103 of the door 102. Ends of the intermediate attachment members 107 may be coupled directly to the second lock component 122 to facilitate the coupling of the second lock component 122 to the door 102. The first and second handle components 111, 112 are both located on the same side of the door 102, and more specifically both are located along the front surface 104 of the door 102. The only part of the handle 110 which extends past the front surface 104 of the door 102 is the connection protrusions 105 which extend into the openings 106 in the door 102. Otherwise, the entirety of the handle 110 and the components contained therein are located on the front surface side of the door 110. The second lock component 122 is located on the rear surface side of the door 110.

The first handle component 111 comprises a recess 116 formed into the front surface 114. In the exemplified embodiment, the recess 116 is an elongated oval shaped depression formed into the front surface 114 of the handle 110. Of course, the recess 116 could take on other shapes including being square, rectangular, irregular, or the like in other embodiments. In still other embodiments, the recess 116 may be omitted entirely. Furthermore, the first handle component 111 comprises an aperture 117 that extends from the front surface 114 of the first handle component 111 to the rear surface 118 of the first handle component 111. Thus, the aperture 117 forms a passageway through the thickness of the first handle component 111 and from the front surface 114 of the handle 110 into the handle cavity 113. In the exemplified embodiment, the aperture 117 is circular shaped, but the invention is not to be so limited in all embodiments and the aperture 117 could take on other shapes. In the exemplified embodiment, the aperture 117 is located along the recess 116. In other embodiments, the aperture 117 may not be located along the recess 116.

In the exemplified embodiment, there is a cover 130 that is coupled to the handle 110, and more specifically to the first handle component 111 to cover the aperture 117. Specifically, the cover 130 may serve two functions, including covering the aperture 130 so that liquids and other pollutants cannot pass therethrough into the handle cavity 113, and being a label that has a number for purposes of numbering the associated storage cavity. In some embodiments, the invention is described such that the handle 110 comprises a window 119, with the window 119 comprising the aperture 117 and the cover 130. Thus, the cover 130 may also serve a third function due to it being part of the window 119 which provides visual access to the indicator component as described further below.

The cover 130 is coupled to the handle 110 within the recess 116 so that a portion of the cover 130 covers the aperture 117. Specifically, the cover 130 comprises a transparent portion 131 that covers the aperture 117 and a label portion 132 which includes indicia 133 indicative of a number associated with the storage apparatus 1000 or with a particular storage cavity 101 of the storage apparatus 1000. The label portion 132 may be transparent or opaque, but the transparent portion 131 must be transparent so that it can function as the window 119 in conjunction with the aperture 117 to provide visual access into the handle cavity 113 for the reasons described below. While the term "transparent" is used herein, it should be appreciated that the transparent portion 131 need not be clear. Rather, the transparent portion 131 should simply allow light to pass therethrough so that objects behind the transparent portion 131 can be seen. Thus, the term "transparent" as used with reference to the transparent portion 131 may include translucent materials or tinted materials so long as objects on the other side of the transparent portion 131 are visible, unless specifically stated otherwise. The cover 130 may have an adhesive on its non-exposed surface to facilitate the coupling of the cover 130 to the handle 110. The cover 130 may be readily detached from the handle 110 and replaced as needed if it becomes damaged such that the aperture 117 becomes exposed, a new number needs to be applied, or for any other reason. The cover 130 may be printed with the indicia 133 or number by the end-user, and thus the number could be excluded therefrom if so desired. The cover 130 may be formed from a plastic sheet material or a film-like material, or the like.

There is a printed circuit board 150 and an indicator component 160 located within the handle cavity 113 of the handle 110. The printed circuit board 150 comprises a reader component 151 that is configured to obtain credential data from a credential device to facilitate the locking and unlocking of the lock mechanism 120 and also altering of the indicator component 160. The reader component 151 and the indicator component 160 both form part of an electronics assembly of the locking system of the storage apparatus 1000 as described in greater detail below with specific reference to FIG. 7. The reader component 151 may also be referred to herein as an antenna, which is a structure that receives and transmits data which may be in the form of radio electromagnetic waves. The reader component 151 is an electronic device (such as a card reader or the like) that is configured to receive and analyze credential data to compare it to authenticated credential data in order to determine whether a particular user should be granted access to the storage apparatus 1000 or one of the storage cavities 101 thereof and its contents. The reader component 151 may be an access control card reader in some embodiments in that it is configured to read a credential to allow access.

When the storage apparatus 1000 is fully assembled, the printed circuit board 150 and particularly the reader component 151 thereof as well as the indicator component 151 may be powered by the power source 126 located within the actuator housing 125 of the locking mechanism 120. Thus, the printed circuit board 150 may be coupled to the power source 125 using an electrical conductor, such as a wire, and more specifically a flat ribbon wire or the like. The reader component 151 may be a radio frequency identification (RFID) antenna, a near-field communication (NFC) antenna, or the like such that it may communicate with a credential device using RFID, NFC, or other similar wireless technologies. The reader component 151 may include a sensor that sticks out therefrom for sensing when an object (such as a credential device) is held close thereto and only powers the reader component 151 after sensing an object, in order to conserve power. Moreover, in some embodiments all hardware necessary to operate the indicator component 151 may be located within handle cavity 113.

The reader component 151 may be configured to receive data from a credential device such as a keycard, a smart phone, a fob, biometrics, or the like, and may send that data to a controller for authentication. Alternatively, the reader component 151 may be configured to perform authentication procedures on its own without transmitting the credential data to a separate controller. Upon authentication, the controller (or reader component 151) may cause the locking mechanism 120 to alter from the locked state to the unlocked state or vice versa, and may simultaneously cause the indicator component 160 to alter its state to properly indicate whether the locking mechanism 120 is in the locked state or the unlocked state (the indicator component 160 and its function will be described in much greater detail below).

The reader component 151 may operate as a proximity reader that receives data when a credential device is nearby, a swipe reader that receives data when the credential device is swiped, an insert reader that receives data when a credential device is inserted, a magnetic stripe reader, a bar code reader, a smart card reader, a biometric reader, or the like. Of course, other types of reader components 151 may be used, so long as the reader component 151 is capable of receiving credential data from a credential device to facilitate the operation of the indicator component 160 and/or the locking mechanism 120. The credential devices store access credentials which are received and read by the reader component 151 (or a controller associated therewith) to determine whether to provide the user with access to the storage apparatus 1000 that the user is attempting to access. In some embodiments, the reader component 151 may comprise the circuitry necessary to enable the reader component 151 to communicate directly with the locking mechanism 120 and/or the indicator component 160 without needing an additional controller. In other embodiments, an additional and separate controller may be located on the printed circuit board 150 within the handle 110, within the actuator housing 125, or elsewhere, so long as the controller is in operable communication with the reader component 151, the locking mechanism 120, and the indicator component 160.

The indicator component 160 is configured to indicate a status of the locking mechanism 120 to a user or potential user of the storage apparatus 1000. In particular, the indicator component 160 is configured to provide a visual indication of the status of the locking mechanism 120 to the user or potential user. In the exemplified embodiment, the indicator component 160 comprises, or is, an electronic paper (also known as electronic ink, e-ink, or electrophoretic display). An electronic paper is a display device that has many uses and potential uses, but in regards to the invention disclosed herein is being used at least in part to indicate the status of the locking mechanism 120 to the user. Thus, the indicator component 160 is configured to transition or alter between a first display state whereby the indicator component 160 displays a first visual and a second display state whereby the indicator component 160 displays a second visual that is different than the first visual. In one particular embodiment, in the first display state the indicator component 160 or a portion thereof has a first color displayed thereon and in the second display state the indicator component 160 or a portion thereof has a second color displayed thereon, with the second color being different than the first color. In one specific embodiment, the first color may be red and may be used to indicate that the locking mechanism 120 is in the locked state and the second color may be white and may be used to indicate that the locking mechanism 120 is in the unlocked state. Thus, the indicator component 160 may be in the first display state when the locking mechanism 120 is in the locked state and the indicator component 160 may be in the second display state when the locking mechanism 120 is in the unlocked state. Of course, while color is one way that the first and second display states may be distinguished, it is not the only way to achieve this. In other embodiments, the first and second display states may display different patterns, different messages, different icons, or the like which the user can readily equate to a particular status of the locking mechanism 120 based on generally understood symbolism.

Electronic paper is bi-stable, which means that it only consumes power while the display is changing, transitioning, or otherwise being updated. No power is required to maintain the displayed image after it has been updated. The power required for the update process (i.e., the power required to change what is displayed on the indicator component 160) is of the order of milliwatts. Thus, the electronic paper may be in the first display state displaying the first color when it receives a supply of power which causes the electronic power to change into the second display state. Once the electronic paper is in the second display state and displaying the second color, power does not need to be continually transmitted to the electronic paper and it can simply maintain the second color in its display without power supplied thereto. The indicator component 160 must be coupled to a power supply, although power need not be continuously supplied thereto. In some embodiments, the indicator component 160 is operably coupled to the power supply 126, which is the same power supply that powers the locking mechanism 120. Thus, there is a need to conserve power to avoid having to replace the batteries too frequently. By only supplying power to the indicator component 160 when its display state is changing, such conservation of the power source 126 is achieved. A voltage need only be applied to the indicator component 160 when it is changing between the first and second display states. Electronic paper technologies are known in the art and thus a more detailed description of that technology will not be provided here.

As noted above, the indicator component 160 is located within the handle cavity 113 of the handle 110. Moreover, the indicator component 160 is positioned in the handle cavity 113 in alignment with the window 119 that is formed by the aperture 117 and the transparent portion 131 of the cover 130. This provides a user or potential user of the storage apparatus 1000 with visual access to the indicator component 160. Thus, whether the indicator component 160 is in the first display state or the second display state, the display emitted by the indicator component 160 will be visible to a user through the aperture 117 of the handle 110. In this way, the user will be able to easily and readily determine whether the locking mechanism 120 is in the locked or unlocked state based on whether the first or second display state (i.e., the first or second color, the first or second pattern, the first or second message or icon, or the like) is visible through the window 119.

Figure 7:
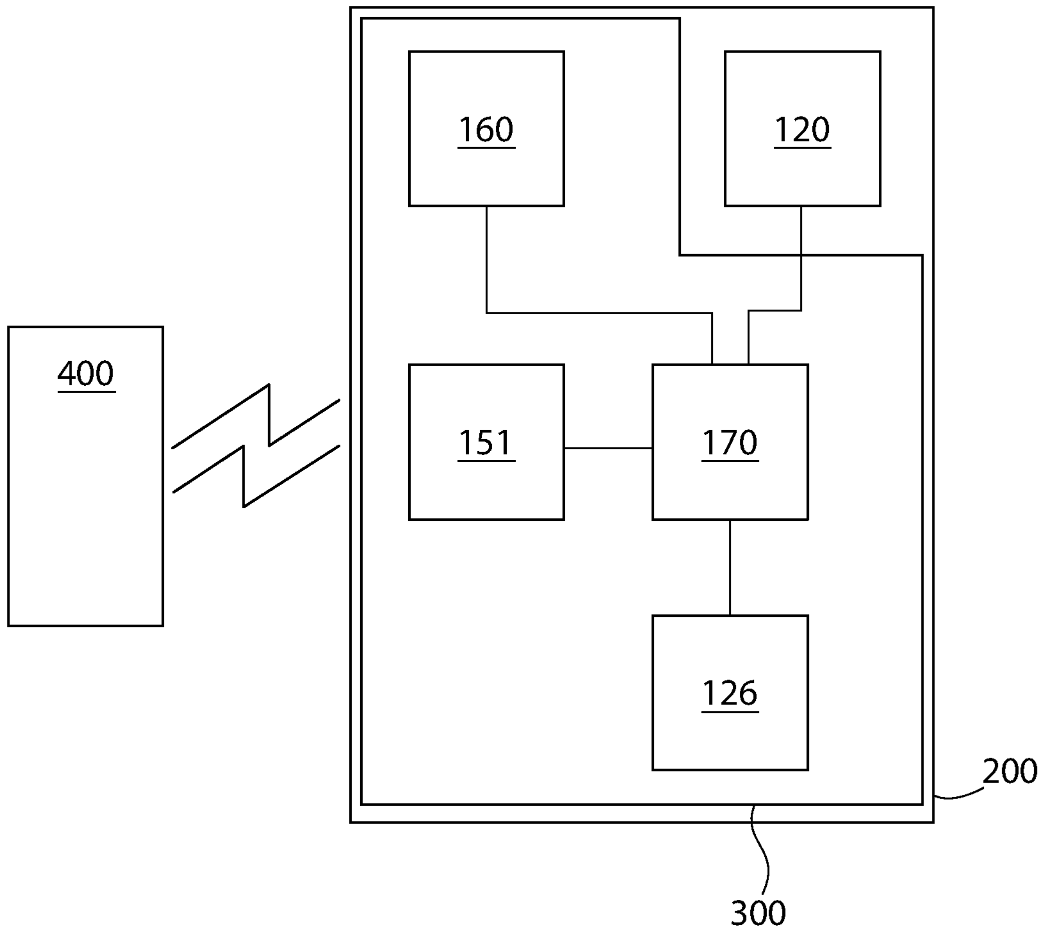
FIG. 7 is a schematic electronic diagram of a locking system of the storage apparatus of FIG. 1.

FIG. 7 is a schematic electronic diagram which illustrates the various components involved in the functional aspects of the storage apparatus 1000 described herein. In particular, the storage apparatus 1000 comprises a locking system 200 which in turn comprises an electronics assembly 300 and the locking mechanism 120. The electronics assembly 300 comprises a controller 170, the power source 126, the reader component 151, and the indicator component 160, all of which are operably coupled together. In the exemplified embodiment, the controller 170 is operably coupled to each of the indicator component 160, the reader component 151, and the power source 126, but other arrangements of operable and electric coupling between the components may be possible in other embodiments. Moreover, in some embodiments the reader component 151 may form part of the controller 170 such that the controller 170 may comprise the reader component 151 or vice versa.

The controller 170 (or control unit or processor or control circuit) may in some embodiments comprise a processor and a memory device. The processor and memory device may be separate components, or the memory device may be integrated with the processor within the controller 170. Furthermore, the controller 170 may include only one processor and one memory device, or it may include multiple processors and multiple memory devices. The processor of the controller 170 may be any computer or central processing unit (CPU), microprocessor, micro-controller, computational device, or circuit configured for executing some or all of the processes described herein, including without limitation: (1) causing power to be transmitted from the power source 126 to the locking mechanism 120 to alter the locking mechanism 120 between the locked and unlocked state; and (2) causing power to be transmitted from the power source 126 to the indicator component 160 to cause the indicator component 160 to transition between the first display state and the second display state.

The memory device of the controller 170 may include, without limitation, any suitable volatile or non-volatile memory including random access memory (RAM) and various types thereof, read-only memory (ROM) and various types thereof, USB flash memory, and magnetic or optical data storage devices (e.g. internal/external hard disks, floppy discs, magnetic tape CD-ROM, DVD-ROM, optical disk, ZIP™ drive, Blu-ray disk, and others), which may be written to and/or read by the processor which is operably connected thereto. The memory device may store algorithms and/or calculations that can be used (by the processor) to determine when to activate locking mechanism 120 and/or the indicator component 160 as described herein.

Also shown in FIG. 7 is a credential device 400 in operable communication with the reader component 151. The credential device 400 may be any device that contains credentials which can be authenticated by the electronics assembly 300 to provide a user with access to one of the storage cavities 101 of the storage apparatus 100. Thus, the credential device 400 is a security token that grants a user with access to the storage apparatus 1000. The credential device 400 may be a keycard, a proximity card, a swipe card, a fob, a magnetic card, a smart card, an RFID card, an NFC card, an electronic device storing credential information including without limitation a mobile phone or a smart phone, or any other device which may contain credential information that can be transmitted wireless to the reader component 151 of the electronics assembly 300. In other embodiments, there may not be a credential device 400, but in its place a keypad where a code can be typed to allow access to the storage apparatus 1000.

When the credential device 400 is placed near the reader component 151 (the credential device 400 may only need to be placed near the reader component 151 in some embodiments while in other embodiments the credential device 400 may need to be swiped or inserted into the reader component 151), credential data stored on the credential device 400 is transmitted to and received by the reader component 151. The reader component 151 then transmits this credential data to the controller 170 and the controller determines whether the credential data is authenticated. If the credential data is authenticated, this means that the credential device 400 is held by a person who should be granted access to the storage apparatus 1000. In this situation, the locking mechanism 120 is either altered from the locked state to the unlocked state or from the unlocked state to the locked state. Simultaneously, the indicator component 160 is altered from the first display state to the second display state, or from the second display state to the first display state. If the credential data is not authenticated, this means that the credential device 400 is held by a person who should not be granted access to the storage apparatus 1000. In this situation, the controller 170 will not instruct the locking mechanism 120 or the indicator component 160 to change.

There are two main situations whereby a user may approach the storage apparatus 1000 with the credential device 400. The first situation is when a user wants to store items in the storage apparatus 1000. In such a situation, the storage apparatus 1000 may initially be presented to the user with one of the storage cavities 101 unlocked and accessible. In this situation, the user can store his/her items in the storage cavity 101, close the door 102, and then present the credential device 400 to the reader component 151 for authentication. Assuming that the credential data is authenticated, the controller 170 will instruct the locking mechanism 120 to alter into the locked state and the controller 170 will instruct the indicator component 160 to alter from the second display state to the first display state. Later, the user may return to retrieve his or her belongings. Thus, the user will return and again present the credential device 400 to the reader component 151. In this situation, the controller 170 will ensure that the same credential data 400 is being presented as was in the previous situation when the controller 170 causes the locking mechanism 120 to lock, or that the credential device 400 even if different than the original one is nonetheless authorized. If so, the controller 170 will instruct the locking mechanism 120 to unlock and the indicator component 160 to alter from the first display state back to the second display state. Each time the credential data is authenticated, the controller 170 will cause power from the power source 126 to be provided to the indicator 160 and to the locking mechanism 120, which will result in those two components being altered as noted herein.

In one alternative situation, the user may approach a storage cavity that is locked initially, and must present the credential device 400 to the electronics assembly 300 in order to unlock the locking mechanism 120 before being able to either store items therein or access items previously stored therein.

Figure 8A:
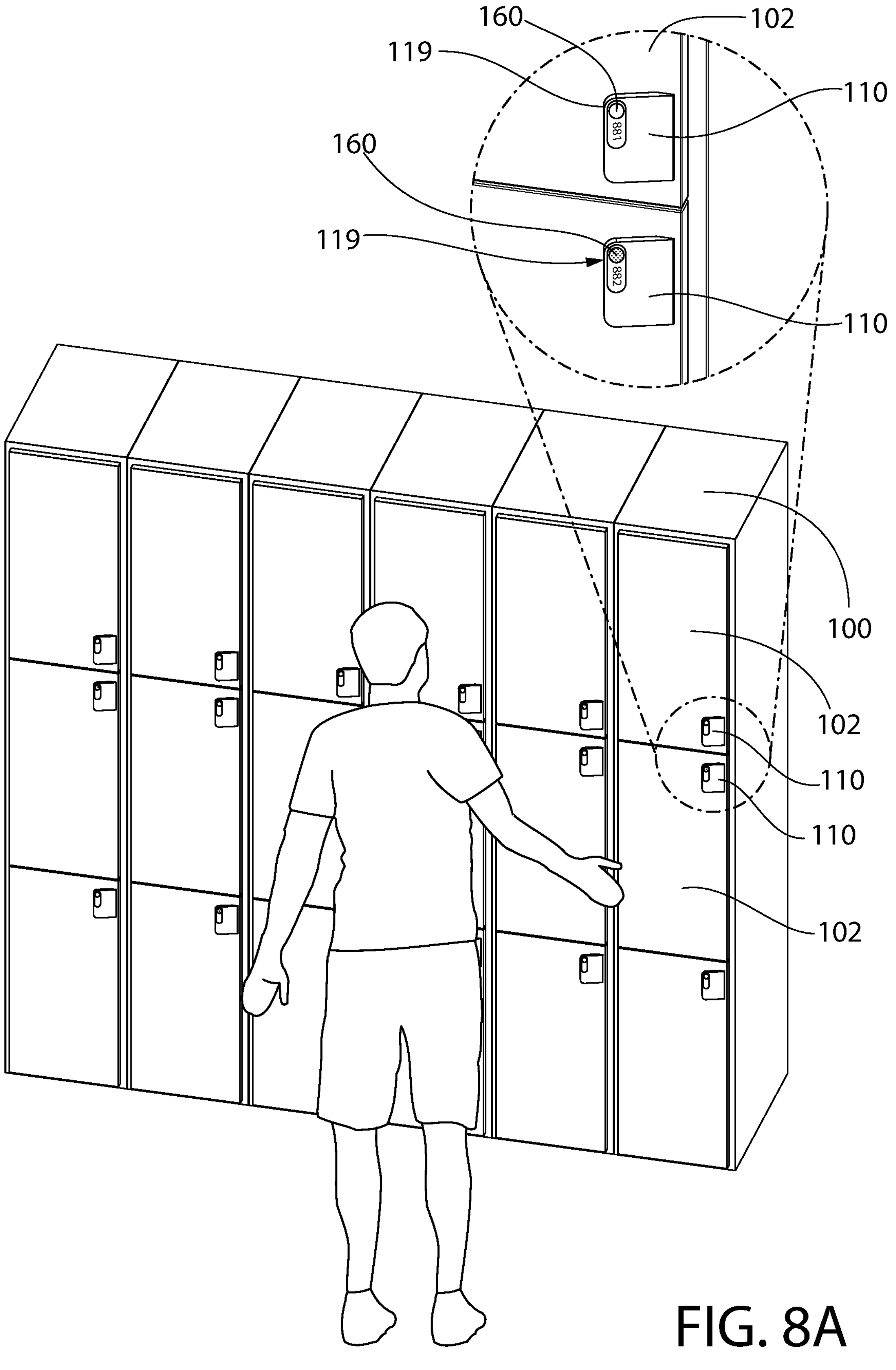
FIGS. 8A-8D are schematic illustrations depicting a user approaching the storage apparatus of FIG. 1 and using a credential device to lock one of the storage cavities thereof.

Referring to FIGS. 8A-8D sequentially, one example of a use situation for the storage apparatus 1000 will be described. In FIG. 8A, a user approaches the storage apparatus 1000 which comprises a plurality of separate and distinct storage cavities, each of which is closed by a door 102. In this embodiment, the doors 102 are all fully closed whether they are in use and locked or not in use and unlocked. It may be possible to incorporate a biasing element or spring which can maintain the unlocked doors 102 slightly ajar, although this may result in a somewhat messy and undesirable appearance. With the doors 102 all in a fully closed position, the user is able to determine which of the storage cavities are in use and which are available for use by viewing the indicator component 160 through the window 119 of the handle 110 as previously described. In this example, two of the doors 102 and their handles 110 are shown enlarged. Within those two storage cavities, one of the locking mechanisms 120 is locked and the other is unlocked. This is indicated to the user by the color, pattern, or other display being displayed by the electronic paper of the indicator component 160.

In particular, the top unit which is labeled as "881" has the indicator component 160 illustrated in a second display state, whereby the indicator component 160 displays as white. The bottom unit which is labeled as "882" has the indicator component 160 illustrated in a first display state, whereby the indicator component 160 displays as red (or some other color, patter, or other display which is visually distinguishable from the second display state). Thus, the user will readily know that the locker number 881 is unlocked and available for use and the locker number 882 is locked and unavailable for use.

Figure 8B:
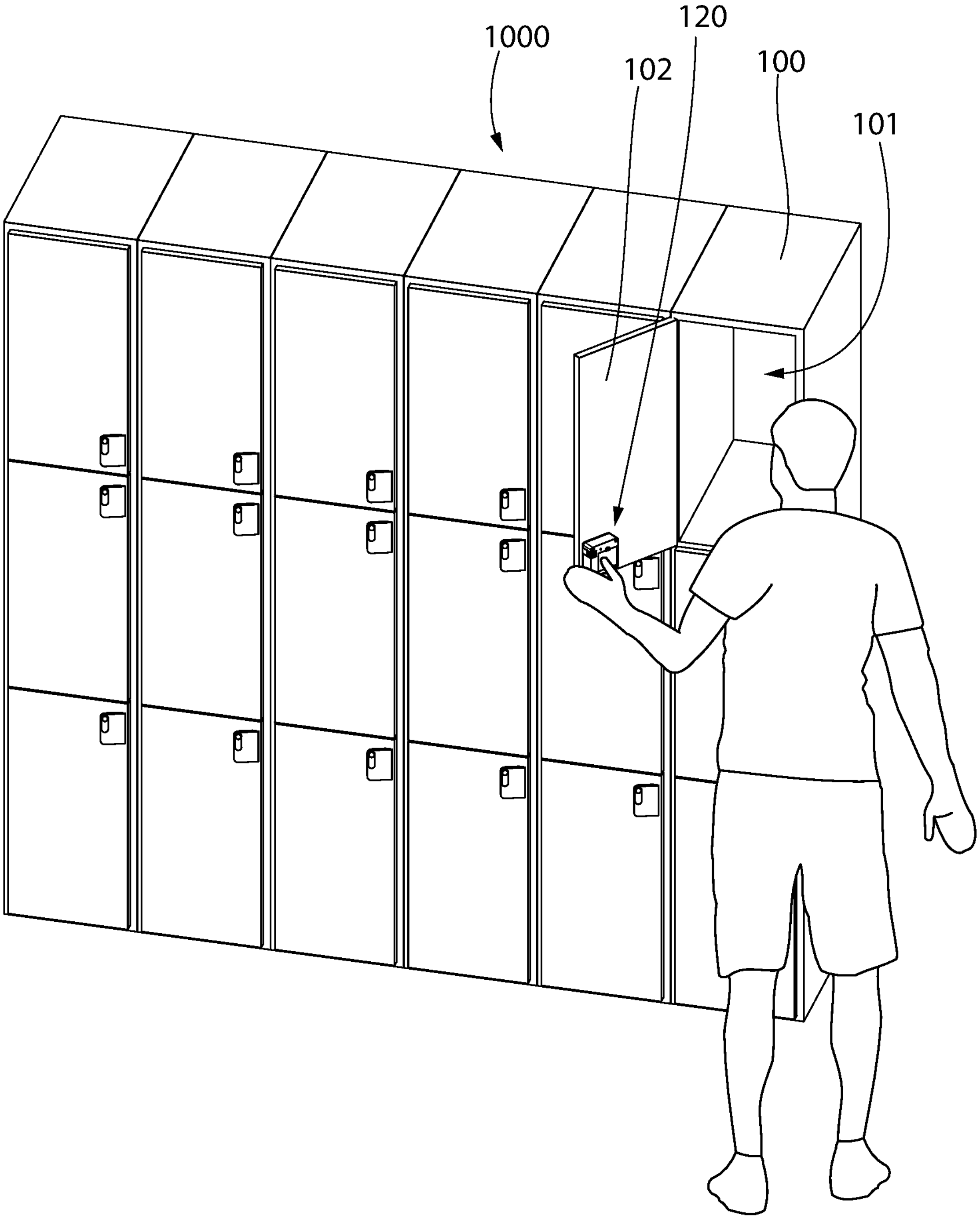
Figure 8C:
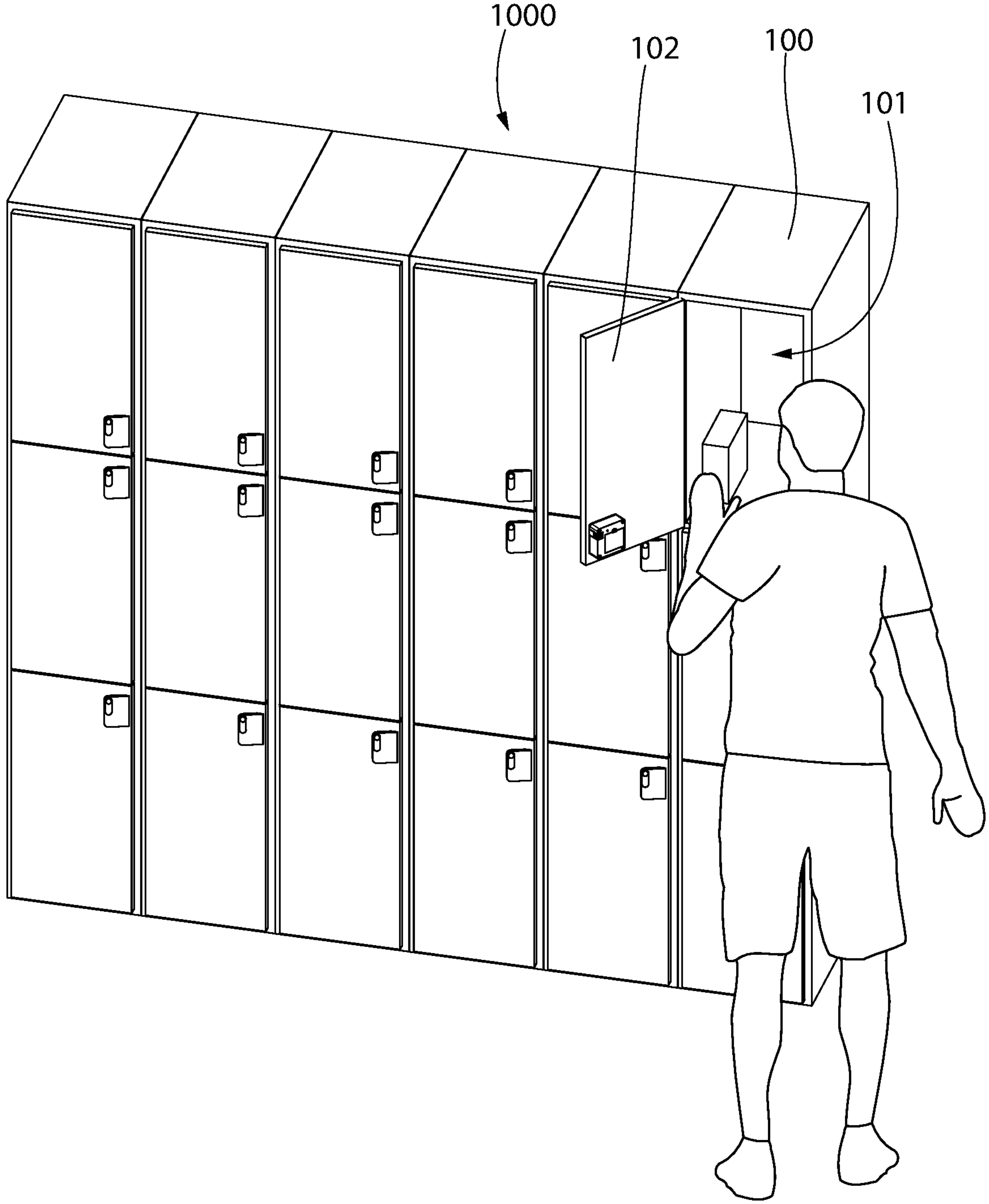

Next, referring to FIG. 8B, the user will open the door 102 associated with the locker number 881 to expose the storage cavity 101. Referring to FIG. 8C, with the door 102 in the open state, the user can place desired objects or items into the storage cavity 101. If the storage apparatus 1000 is located in a locker room, the user may place his or her street clothing into the storage cavity 101 after changing into his or her workout clothing. If the storage apparatus 1000 is a cabinet in a place of work (such as a storage locker in a police station where evidence may be stored, for example), the user may place evidence or other items that the user does not wish to leave out in the open into the storage cavity 101.

Figure 8D:
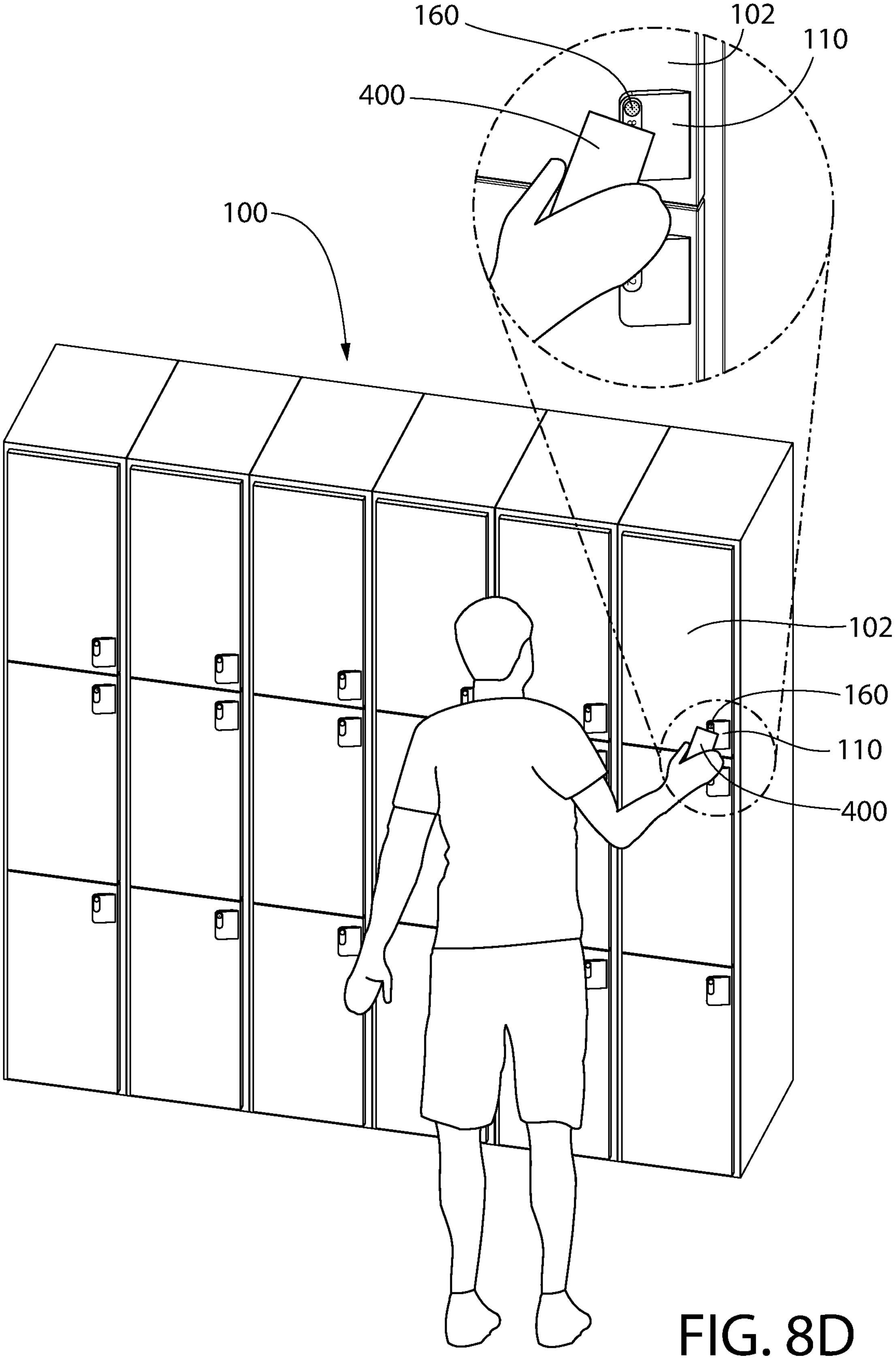

Next, referring to FIG. 8D, the user will close the door 102 into the closed state as shown. Furthermore, the user will then hold his or her credential device 400 (keycard, fob, smartphone, etc.) up to the handle 110 associated with the storage cavity within which the user's items are now stored. The reason that the user holds the credential device 400 up to the handle 110 is because the reader component 151 which wirelessly receives the credential data from the credential device 400 is located in the handle cavity of the handle 110 as previously described. The reader component 151 will transmit the credential data to the controller 170 which can then authenticate the credential data, or the reader component 151 may be configured to authenticate the credential data on its own. Upon the credential data being authenticated, the electronics assembly 300 will transmit instructions to cause: (1) the locking mechanism 120 associated with the particular storage cavity 101 in which the user is storing his/her items to alter from the locked state to the unlocked state; and (2) the indicator component 160 to alter or transition from the second display state (which was white) to the first display state (which is a color, pattern, or the like which contrasts with the first display state, as indicated in by stippling in the figure). When the user wishes to retrieve the articles stored in the storage cavity, the user will again present the credential device 400 to the reader component 151. Upon the credential data being authenticated, the electronics assembly 300 will transmit instructions to cause: (1) the locking mechanism 120 associated with the particular storage cavity 101 in which the user is storing his/her items to alter from the unlocked state to the locked state; and (2) the indicator component 160 to alter or transition from the first display state (which is a color or pattern, or the like) to the second display state (which is a color, pattern, or the like which contrasts with the first display state).

Figure 9:
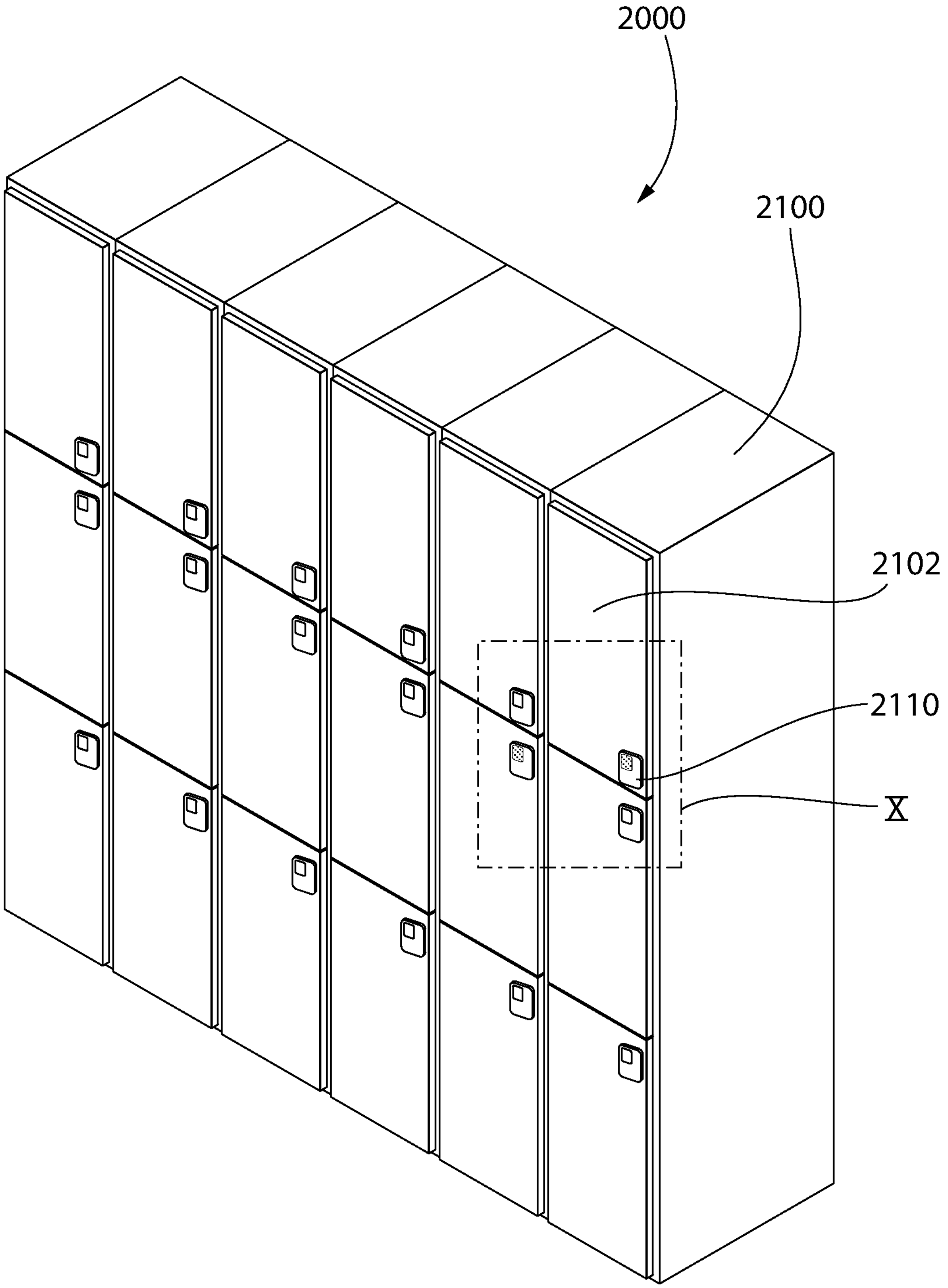
FIG. 9 is a front perspective view of a storage apparatus in accordance with another embodiment of the present invention.
Figure 10:
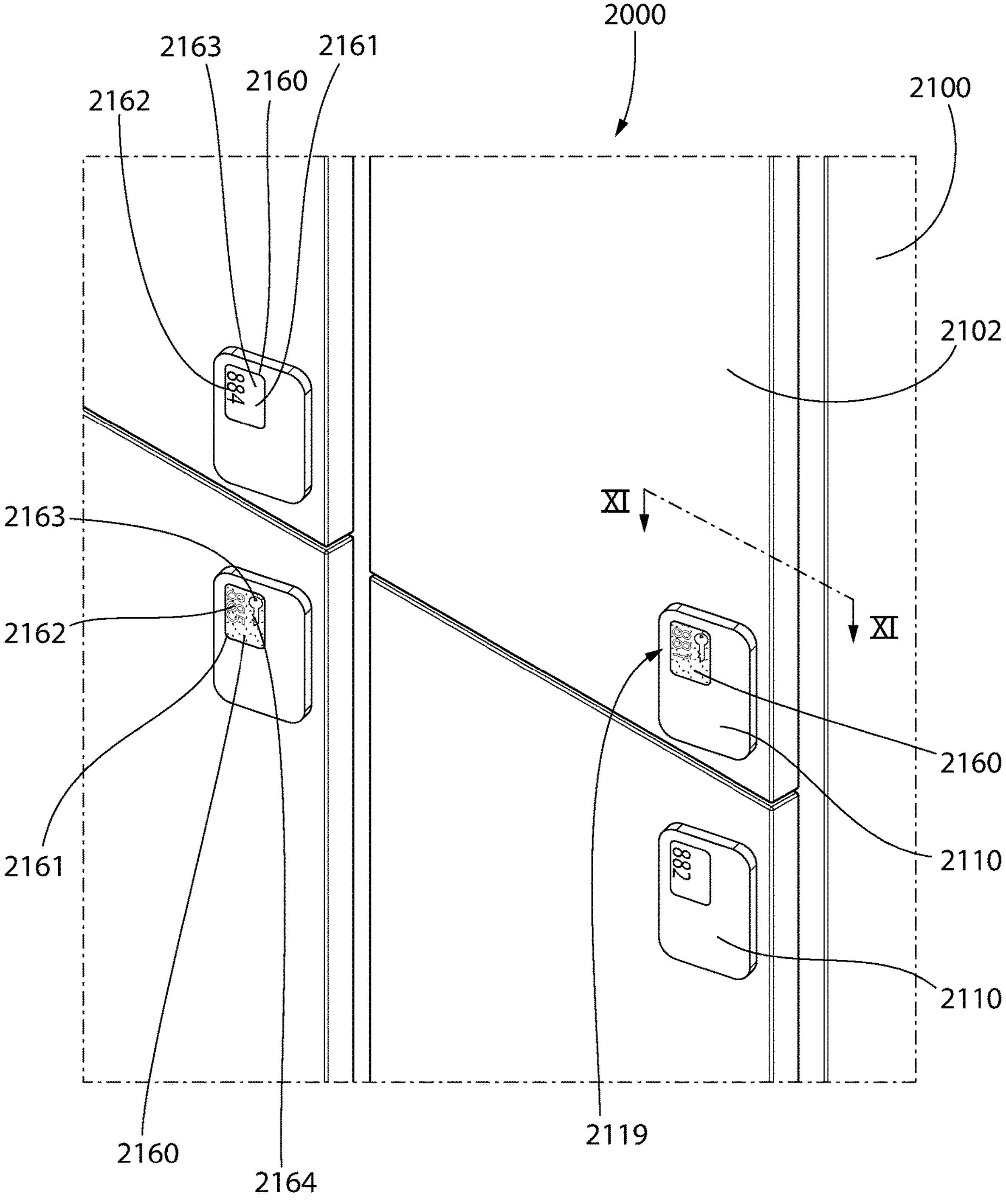
FIG. 10 is a close-up view of area X of FIG. 9.
Figure 11:
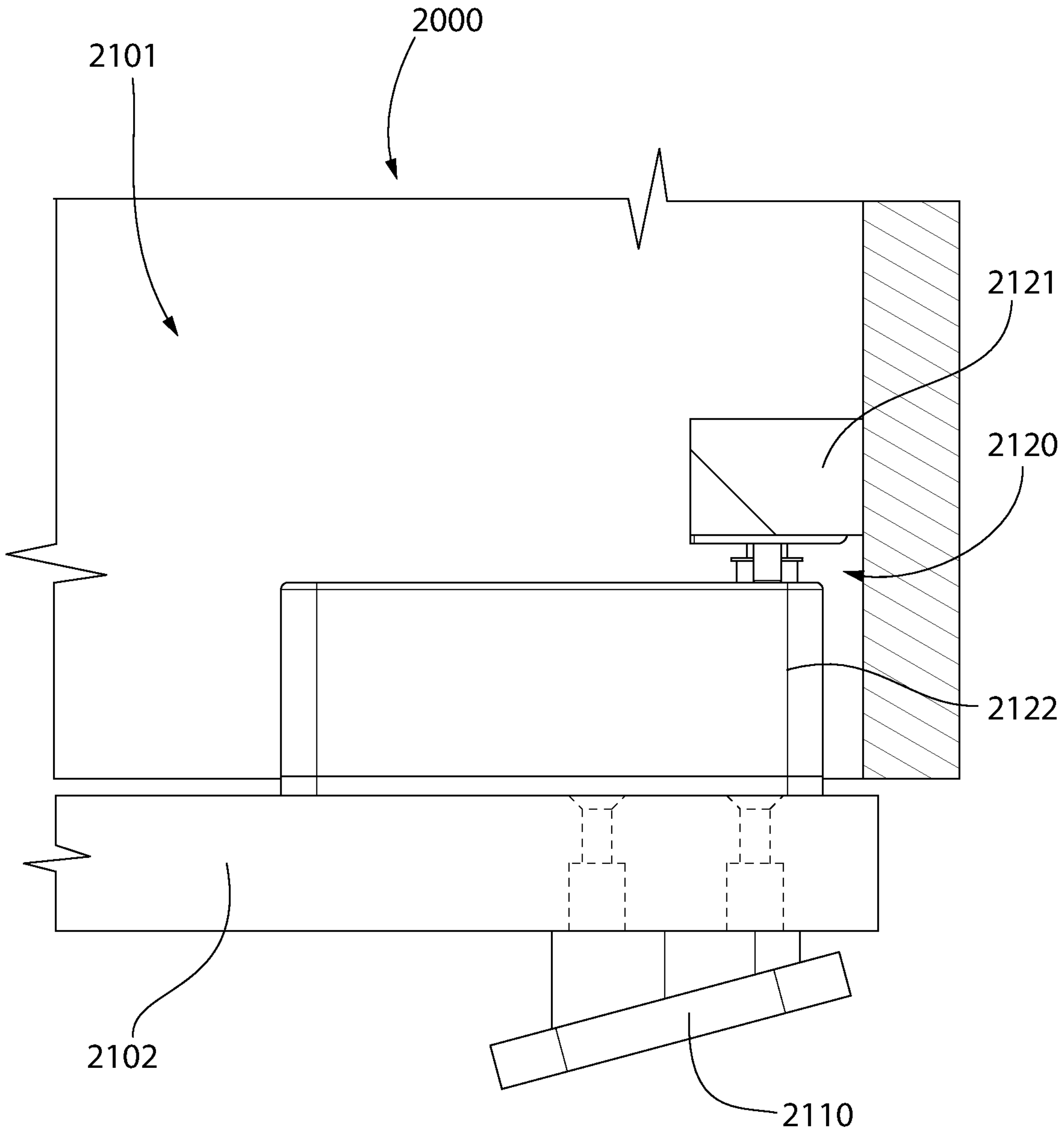
FIG. 11 is a cross-sectional view taken along line XI-XI of FIG. 10.

Referring to FIGS. 9-11, a storage apparatus 2000 is illustrated in accordance with another embodiment of the present invention. The storage apparatus 2000 is very similar to the storage apparatus 1000 described above, and therefore much of the description provided above with regard to the storage apparatus 1000 is applicable to the storage apparatus 2000 except for the differences that are specifically described herein. Thus, the storage apparatus 2000 comprises a housing 2100 comprising a plurality of storage cavities 2101. Each of the storage cavities 2101 is closed by a door 2102 which can be altered between open and closed states. All of the doors 2102 are illustrated in the closed state in FIGS. 9-11. A handle 2110 is coupled to each of the doors 2102 to facilitate the opening and closing of the doors 2102. The handle 2110 is fixed to the door 2102 and is non-movable relative to the door 2102 in a normal use scenario. The connection between the handle 2110 and the door 2102 is the same as that which was described in the prior embodiment and thus this will not be repeated here in the interest of brevity. In fact, much of the structure of the storage apparatus 2000 is the same as the storage apparatus 1000 with the main difference having to do with the indicator component, described below.

The handle 2110 comprises a window 2119 through which an indicator component 2160 is visible and exposed to provide information to a user or potential user of the storage apparatus 2000. The indicator component 2160 is an electronic paper as with the previous embodiment, except the information displayed thereon in the various first and second display states is different than with the previous embodiment. The description will refer back to FIG. 10 to more fully describe the first and second display states of the indicator component 2160 after providing a discussion of the handle 2110 and the components held therein with reference to FIGS. 12A and 12B.

The storage apparatus 2000 further comprises a locking mechanism 2120. The locking mechanism 2120 comprises a first locking component 2121 attached to a sidewall of the housing 2100 and a second locking component 2122 attached to a rear side of the door 2102. The first and second locking components 2121, 2122 comprise locking features which engage each other when the locking mechanism 2120 is in the locked state and which are not in engagement with each other when the locking mechanism 2120 is in the unlocked state. When the locking features are engaged, the door 2102 is prevented from being altered from the closed state to the open state due to the engagement.

Figure 12A:
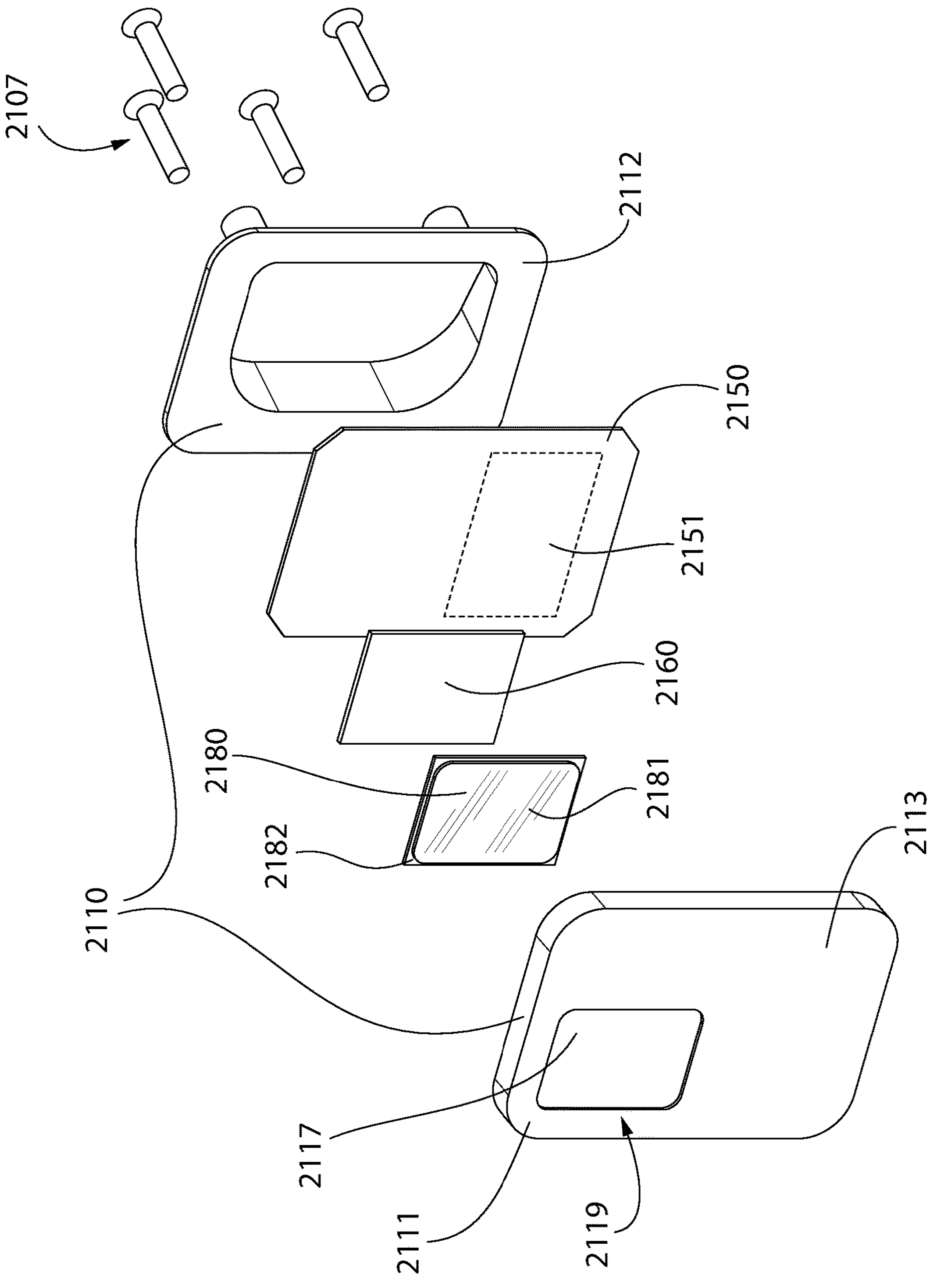
FIGS. 12A and 12B are front and rear perspective and exploded views of a handle of the storage apparatus of FIG. 9.
Figure 12B:
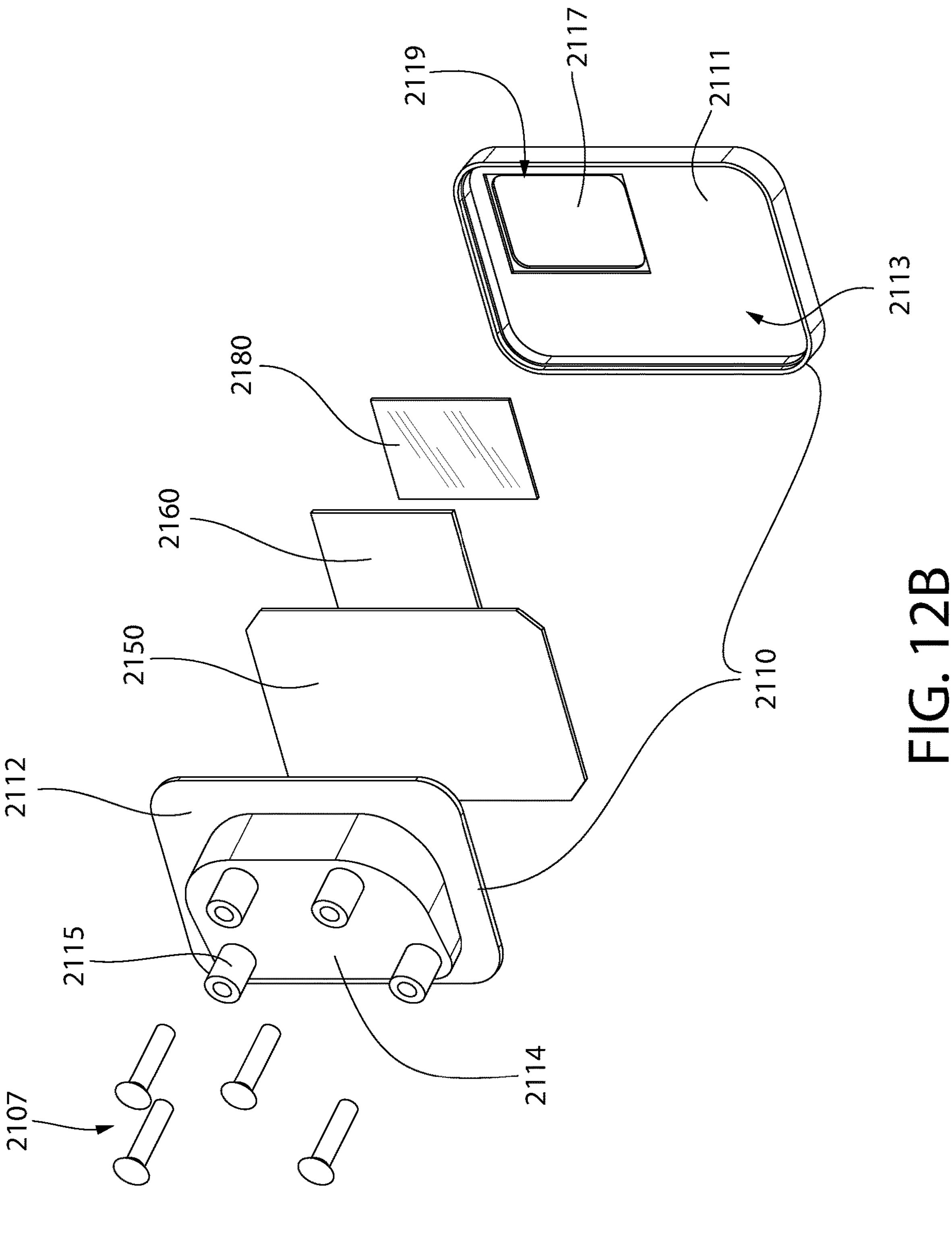

Referring to FIGS. 12A and 12B, the handle 2110 comprises a first handle component 2111 and a second handle component 2112 which when coupled together define a handle cavity 2113. The first handle component 2111 comprises a front surface 2113 of the handle 2110 and the second handle component 2112 comprises a rear surface 2114 of the handle 2110. The second handle component 2112 comprises connection protuberances 2115 that engage with intermediate attachment members 2107 to facilitate the coupling of the handle 2110 to the door 2102. The first and second handle components 2111, 2112 may be coupled together via friction fit, press fit, interference fit, thermal welding, fasteners, or the like. However, it is preferable that when the first and second handle components 2111, 2112 are coupled, the handle cavity 2113 remains therebetween. In the exemplified embodiment, the first handle component 2111 forms the handle cavity 2113 and the second handle component 2112 is positioned within a portion of the handle cavity 2113 of the first handle component 2111 when the first and second handle components 2111, 2112 are coupled together. The details of this were described with reference to the prior embodiment and that description is applicable here.

The first handle component 2111 comprises an aperture 2117 that extends from the front surface 2113 to the handle cavity 2113. Thus, the aperture 2117 is an opening that extends through the thickness of the first handle component 2111. A cover member 2180 is disposed within the handle cavity 2113 and, together with the aperture 2117, forms the window 2119. That is, the cover member 2180 is positioned within the handle cavity 2113 and in alignment with the aperture 2117 to close the aperture 2117 and prevent liquids or other debris from entering into the handle cavity 2113 through the aperture 2117. In the exemplified embodiment, the cover member 2180 comprises a window portion 2181 and a flange portion 2182. The window portion 2181 nest within the aperture 2117 and the flange portion 2182 abuts against the floor of the handle cavity 2113. The cover member 2180, or at least the window portion 2181 thereof, is preferably transparent so that items located behind the window portion 2181 are visible, as described further below. As discussed above, the term transparent is sufficiently broad to include materials that are sufficiently see-through so that objects can be seen therethrough, even if the material is translucent or tinted instead of perfectly clear. The cover member 2180 may be affixed to the first handle component 2111 using adhesives, may be attached via a friction of press fit, or the cover member 2180 may be held within the aperture 2117 due to pressure applied onto its rear from the second handle component 2112 and the other components held in the handle cavity 2113 as described herein.

There is also a printed circuit board 2150 comprising a reader component 2151 disposed within the handle cavity 2113. Furthermore, the indicator component 2160 is located within the handle cavity 2130. The printed circuit board 2150 and the reader component 2151 are the same as that which was described above and therefore an additional discussion of those components will not be provided here in the interest of brevity. That is, the reader component 2151 is configured to receive credential data from a credential device and communicate either directly or indirectly via a controller with the locking mechanism 2120 and the indicator component 2160 to alter them between locked and unlocked states and first and second display states, respectively. The indicator component 2160 is positioned between the first handle component 2111 and the printed circuit board 2150 in alignment with the window 2119 so that the indicator component 2160, or at least a portion thereof, is visible through the window 2119. More specifically, the indicator component 2160 is positioned between the cover member 2180 and the printed circuit board 2150 and in alignment with the aperture 2117.

In this embodiment, the various electronic components are all operably coupled together and FIG. 7 and the relevant description provided above is applicable as a schematic illustration of the operable coupling between the various devices and components.

Referring back to FIG. 10, the indicator component 2160 will be further described. The indicator component 2160 is alterable between a first display state and a second display state, just like with the previous embodiment. However, the first and second display states provide different visuals in this embodiment when compared the embodiment described above. In FIG. 10, two of the indicator components 2160 are in the first display state (the ones with the numerals 881 and 885 therein) and two of the indicator components 2160 are in the second display state (the ones with the numerals 882 and 885 therein). The indicator component 2160 is in the first display state when the locking mechanism 2120 is in the locked state. The indicator component 2160 is in the second display state when the locking mechanism 2120 is in the unlocked state.

The indicator component 2160 is an electronic paper or electronic ink device as with the indicator component 160 described above. However, the indicator component 2160 is not just a color changing electronic paper as with the indicator component 160. Rather, the indicator component 2160 is a dot-matrix type display such that it can display content and/or information that is more substantive than just a color change. Thus, rather than just changing color or pattern from the first display state to the second display state, the indicator component 2160 may change in terms of the content displayed thereon.

The indicator component 2160 comprises a background region 2161, an identifier region 2162, and a status region 2163. In the exemplified embodiment, the background region 2161 displays as a first color when the indicator component 2160 is in the first display state and a second color when the indicator component 2160 is in the second display state. In some embodiments, the first color of the background region 2161 when the indicator component 2160 is in the first display state may be red and the second color of the background region 2161 when the indicator component 2160 is in the second display state may be white. The identifier region 2162 displays a number associated with the storage apparatus 2000 or with one of the storage cavities 2101 thereof. When the indicator component 2160 is in the first display state, the number shown in the identifier region 2162 is displayed as a third color. When the indicator component 2160 is in the second display state, the number shown in the identifier region 2162 is displayed as a fourth color. In some embodiments, when the indicator component 2160 is in the first display state the third color of the number in the identifier region 2162 may be white when the indicator component 2160 is in the second display state the fourth color of the number in the identifier region 2162 may be black. Of course, other colors may be possible in other embodiments.

The status region 2163 may display an icon 2164 only when the indicator component 2160 is in the first display state, and the icon 2164 may not be visible when the indicator component 2160 is in the second display state. Again, the indicator component 2160 is in the first display state when the locking mechanism 2120 is locked. Thus, in this embodiment, the icon 2164 is a key which appears along the status region 2163 of the indicator component 2160 when the indicator component 2160 is in the first display state to indicate that the locking mechanism 2120 is in the locked state. When the indicator component 2160 is in the second display state, the icon 2164 may not appear at all, as shown in the exemplified embodiment. That is, the icon 2164 may blend into the background region 2161 when the indicator component 2160 is in the second display state.

Again, while the differences between the first and second display state have been described throughout as being a difference in color, this difference could be any different in appearance, even if that difference is not color. Thus, the difference could be a different pattern being displayed or any other visual distinction that could readily represent that status (locked or unlocked) of the locking mechanism 2120 to a person viewing the indicator component 2160 through the window 2119 of the handle 2110.

As with the previous embodiment, the reader component 2151 is located in the handle 2102 so a user will place a credential device near the handle 2102 to initiate a lock or unlock sequence. Moreover, the indicator component 2160 is visible through a window 2119 formed in the handle 2102. Thus, an indication as to the lock/unlocked status of the lock mechanism 2120 can be readily portrayed to a user or potential user at the same location (i.e., along the handle 2102) that a user will present the credential device, thus increasing visibility of the indicator component 2160 to the user or potential user. Moreover, this results in a clean aesthetic because no additional features are placed onto the front exposed surface of the door 2102, but rather all components associated with the locking system are located within the handle 2110 or on the rear side of the door 2102 which is not exposed unless the door 2102 is open.

Figure 13:
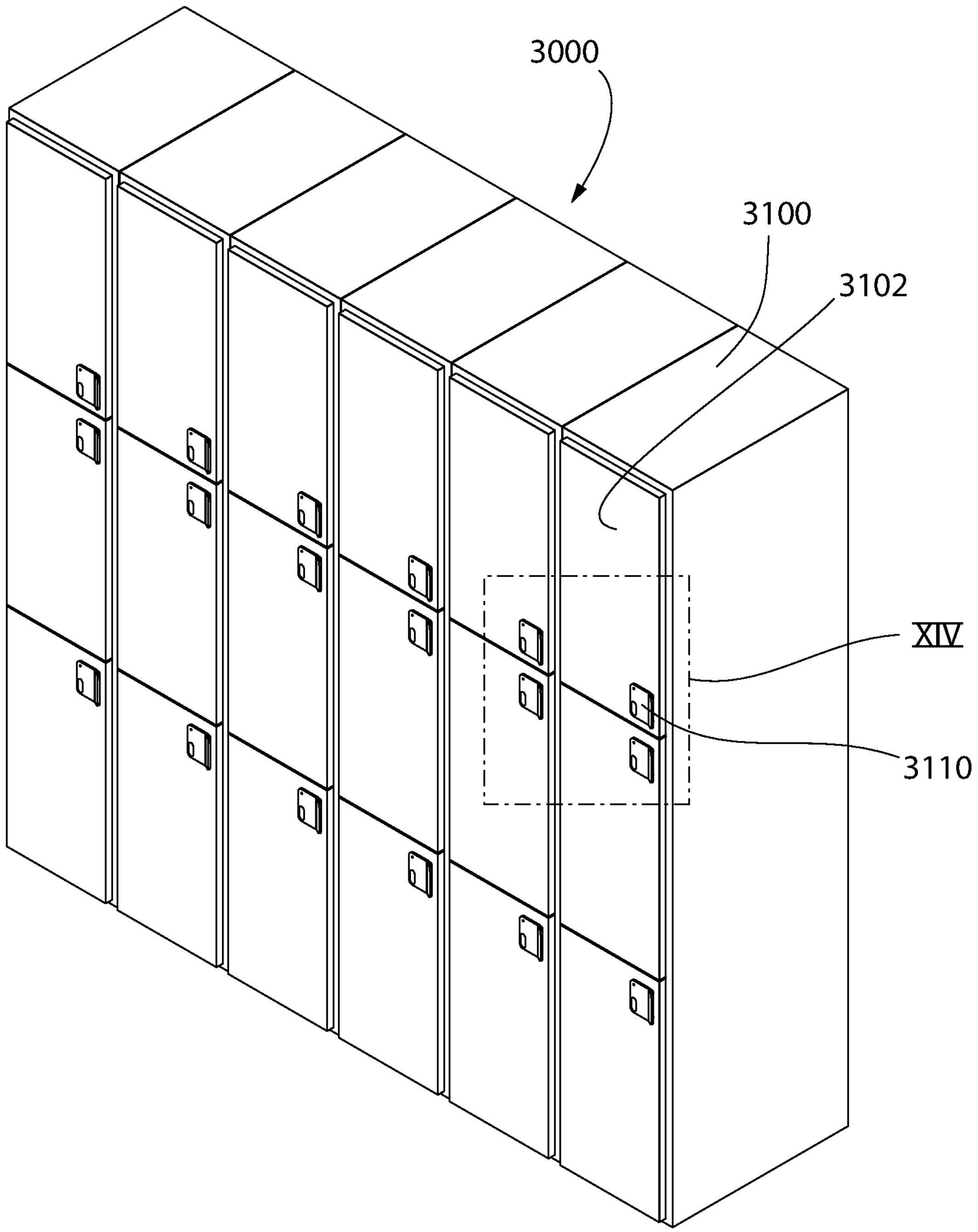
FIG. 13 is a front perspective view of a storage apparatus in accordance with yet another embodiment of the present invention.
Figure 14:
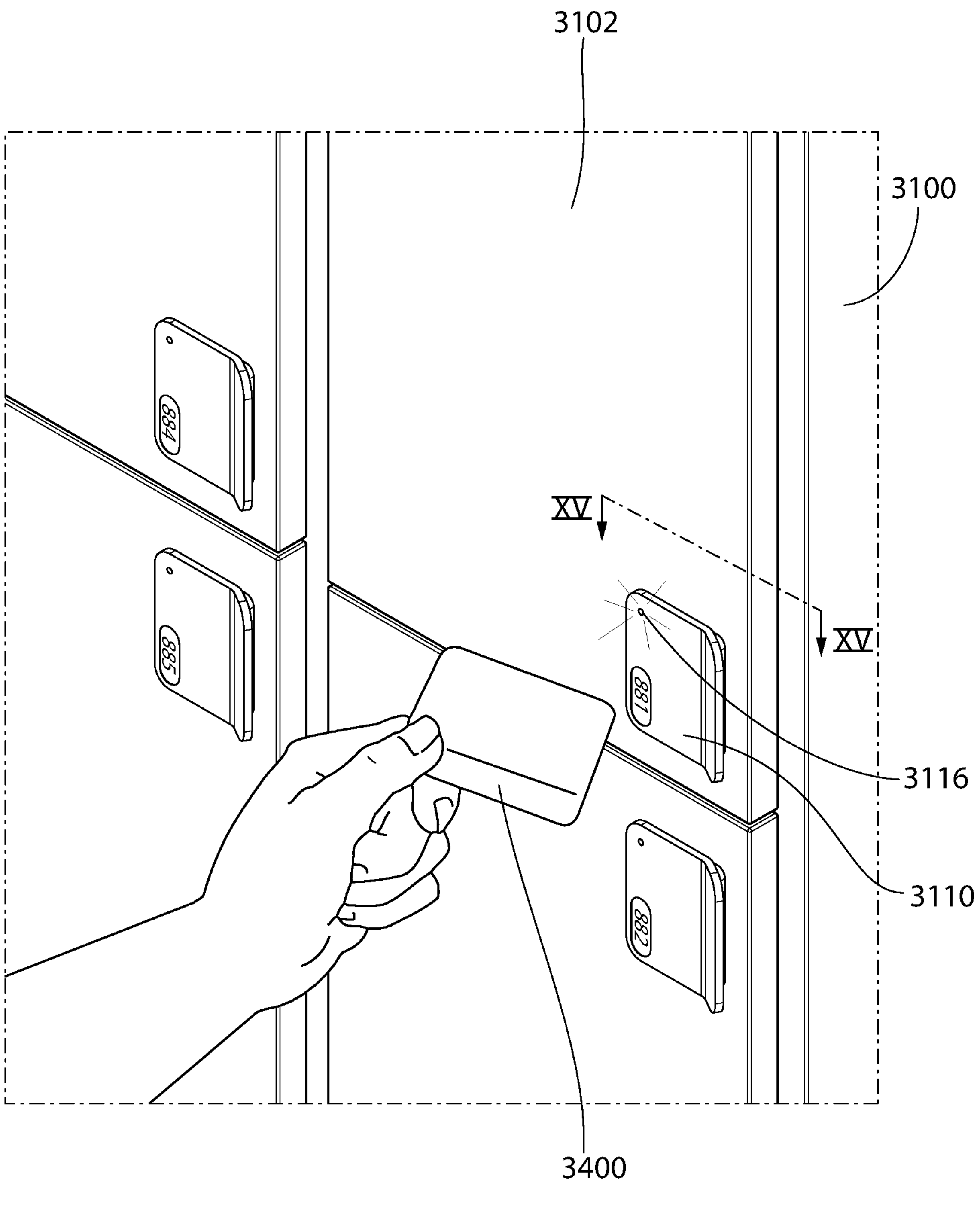
FIG. 14 is a close-up view of area XIV of FIG. 13.
Figure 15:
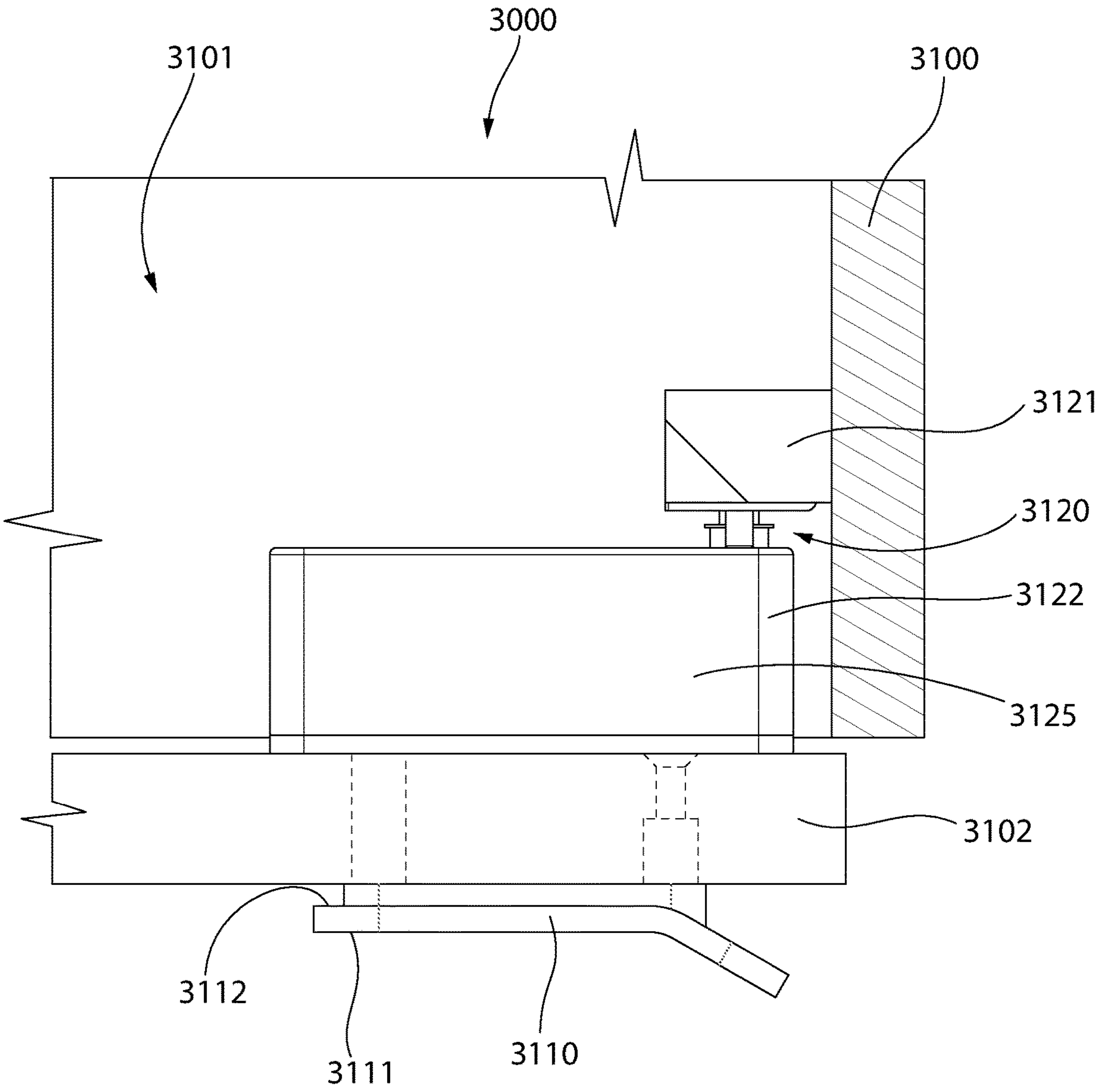
FIG. 15 is a cross-sectional view taken along line XV-XV of FIG. 14.

Referring to FIGS. 13-15, another embodiment of a storage apparatus 3000 is illustrated. The storage apparatus 3000 is very similar to the storage apparatuses 1000, 2000 except with regard to the indicator component, which is not an electronic paper in this embodiment. Rather, in this embodiment the indicator is a light source which blinks periodically as described further herein. Thus, the storage apparatus 3000 comprises a housing 3100 comprising a plurality of storage cavities 3101. The storage apparatus 3000 comprises a plurality of doors 3102 such that each door 3102 is associated with one of the storage cavities 3101 so that the doors 3102 can close the storage cavities 3101. A handle 3110 is attached to each of the doors 3102. In the exemplified embodiment, the handles 3110 are non-movably coupled to the doors 3102 and can be pulled to alter the doors 3102 from a closed state to an open state. The doors 3102 can be locked by a lock mechanism 3120 which is alterable between locked and unlocked states as described in detail herein above. The lock mechanism 3120 comprises a first lock component 3121 and a second lock component 3122 that engage each other to lock the door 3102 in the closed state. The lock mechanism 3120 can be automatically transitioned between locked and unlocked states using credential authentication as described herein. The lock mechanism 3120 may be the same as the lock systems 120, 2120 described above and therefore a detailed description of the lock mechanism 3120 will not be provided here in the interest of brevity. As seen in FIG. 14, in this embodiment when a user presents a credential device 3400 to the storage apparatus 3000, a light may flash momentarily.

Figure 16:
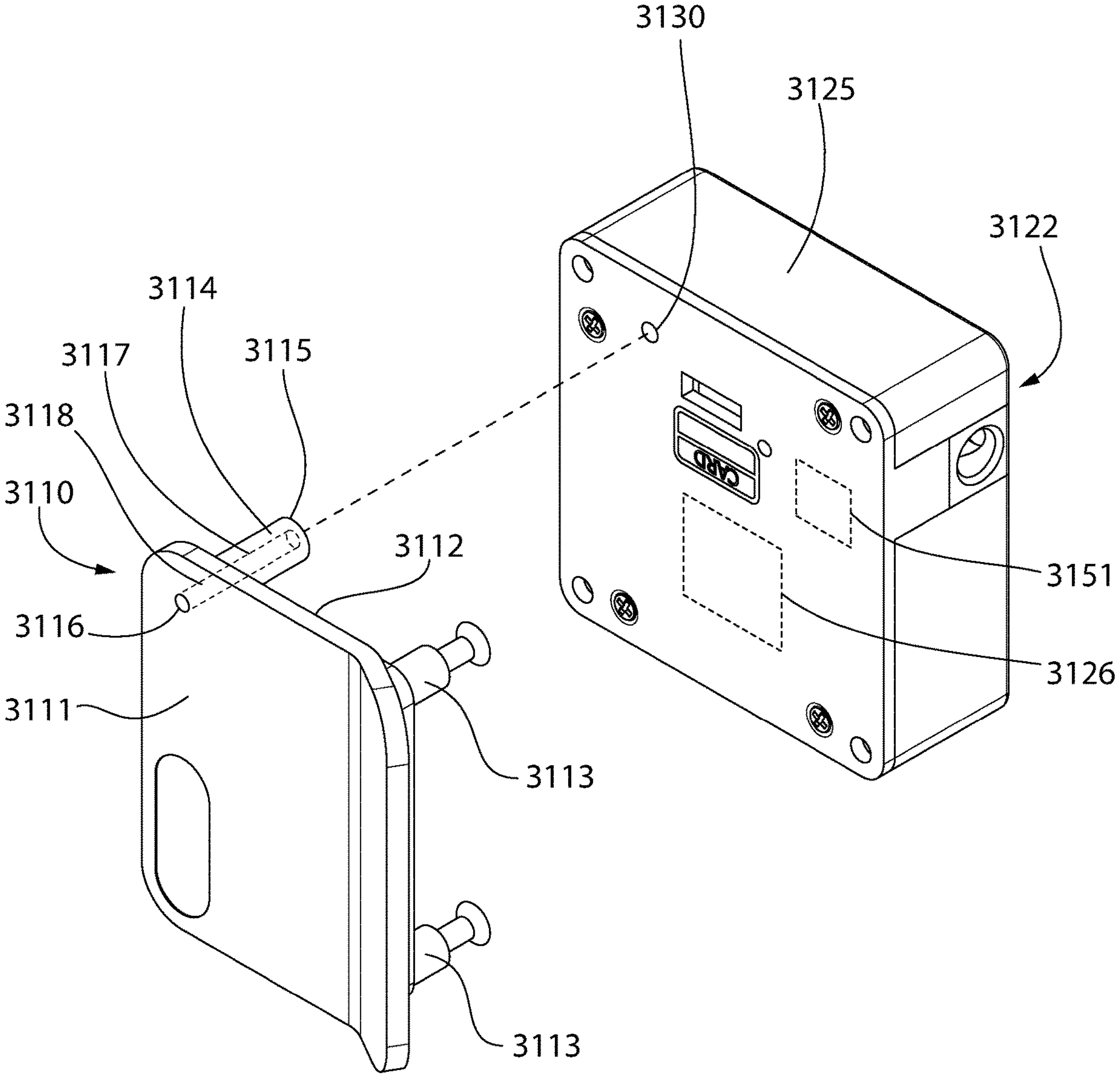
FIG. 16 is a perspective view illustrating alignment between a handle and a first component of a locking mechanism of the storage apparatus of FIG. 13.

Referring to FIGS. 15 and 16, the handle 3102 and an actuator housing 3125 of the second lock component 3122 will be described. The actuator housing 3125 houses a power source 3126 that is used to power all of the electronic components, including the locking mechanism 3120 and a reader component 3151. In this embodiment, the reader component 3151 is housed within the actuator housing 3125 of the locking mechanism 3120, rather than being housed within a handle cavity of the handle 3110. Specifically, in this embodiment the handle 3110 may not have a cavity, and thus there may not be any antenna or indicator or other electronic components housed therein. Instead, these components may be housed in the actuator assembly 3125 of the locking mechanism 3120. At any rate, the electronic components are all operably coupled to the power source 3126.

The actuator housing 3125 also comprises an illumination element 3130. The illumination element 3130 may be any component that is capable of generating and emitting light. The illumination element 3130 may be referred to herein as a light source. In one particular embodiment, the illumination element 3130 comprises one or more a light emitting diodes.

In this embodiment, the various electronic components are all operably coupled together. FIG. 7 and the relevant description provided above is applicable as a schematic illustration of the operable coupling between the various devices and components, except that the indicator component 160 would be replaced with the illumination element 3130 which operates/functions as the status indicator.

The handle 3110 comprises a front surface 3111 and a rear surface 3112. The front surface 3111 is exposed to a user who approaches the storage apparatus 3000 and the rear surface 3112 faces the door 3102. The handle 3110 comprises an opening 3116 in the front surface 3111. The handle 3110 comprises a plurality of connection legs 3113 protruding from the rear surface 3112 for purposes of coupling the handle 3110 to the door, as described in more detail with reference to FIG. 17. Furthermore, the handle 3110 comprises a lightpipe leg 3114 protruding from the rear surface 3112. The lightpipe leg 3114 is a cylindrical leg that defines a passageway 3117 from a distal end 3115 of the lightpipe leg 3114 to the opening 3116 in the front surface 3111 of the handle 3110. Thus, the passageway 3117 of the lightpipe leg 3114 is aligned with the opening 3116 in the front surface 3111 of the handle 3110. There may be a light pipe element 3118 positioned within the passageway 3117 to facilitate the transfer of light from the illumination source 3130 to the opening 3116. The light pipe element 3118 may serve as a light pipe, which is a clear tube that transmits light form a light source (the illumination source 31300 to a user interface or the like (to the opening 3116). Such light pipe elements 3118 are designed to carry light short distances with high efficiency to deliver excellent visual indication with minimal loss of light intensity. Such a light pipe element 3118 may be made of a material which is known to facilitate the transfer of light from one location to another. For example, the light pipe element 3118 may be made from optical acrylic, polycarbonate, or the like. The light pipe element 3118 may be sized to fit snugly within the passageway 3117 defined by the lightpipe leg 3114. With that said, the light pipe element 3118 may be omitted in some embodiments and the simple passageway 3117 may be sufficient to transfer the visible light from the illumination source 3130 to the opening 3116 in the front surface 3111 of the handle 3110 where it can be seen by a user of the storage apparatus 3000.

It is important to make sure that when the actuator housing 3125 and the handle 3110 are mounted to the door 3102 that the passageway 3117 of the light pipe leg 3114 is aligned with the illumination element 3130 on the actuator housing 3125. This will ensure that when the illumination element 3130 generates and emits light, it is visible at the opening 3116 on the front surface 3111 of the handle 3110.

Figure 17:
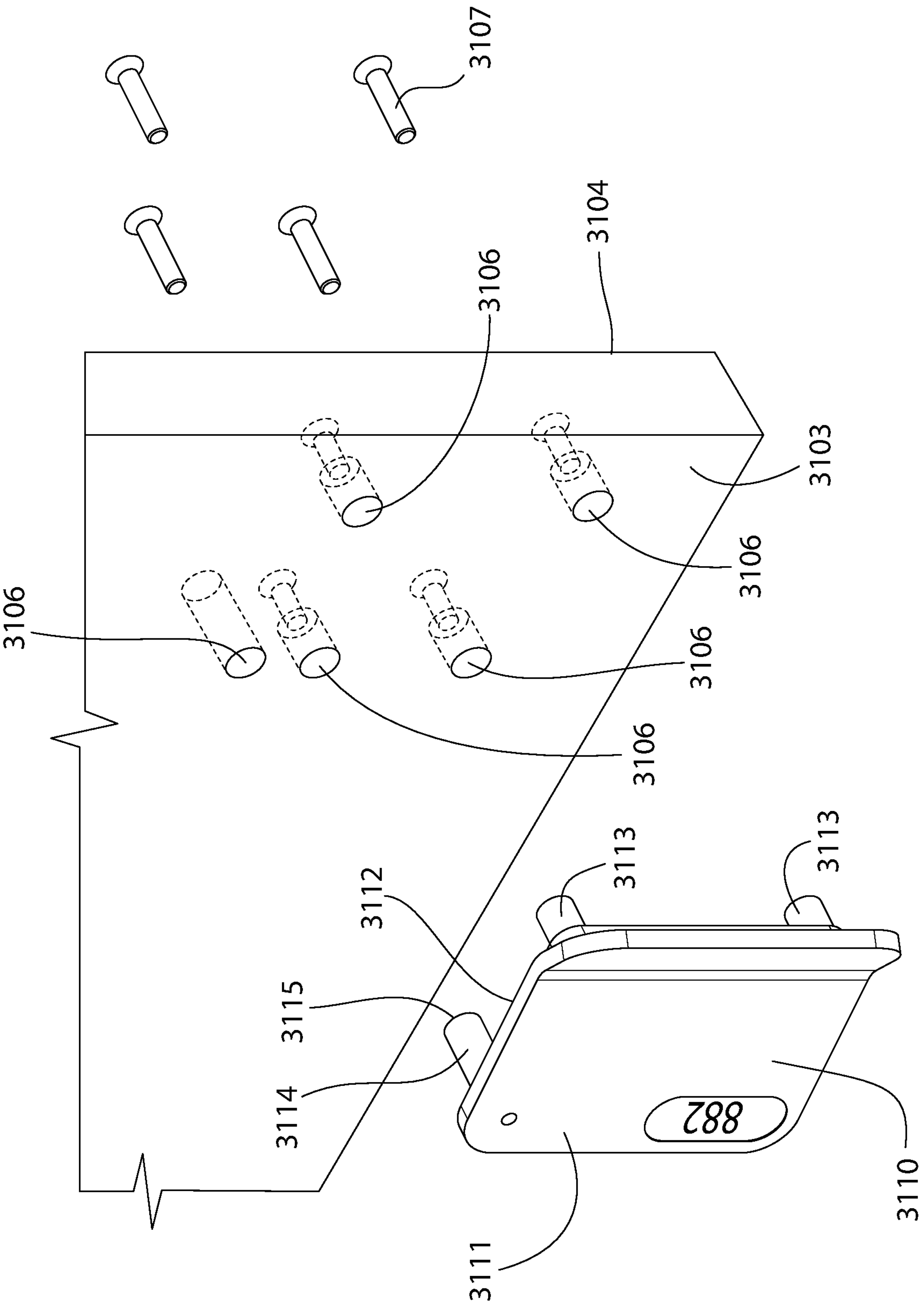
FIG. 17 is a perspective view illustrating alignment between the handle and a door of the storage apparatus of FIG. 13.

FIG. 17 illustrates the handle 3110 in preparation for being coupled to the door 3102. In particular, the door 3102 comprises a plurality of openings 3106 that extends through the full thickness of the door 3102 from the front surface 3103 of the door 3102 to the rear surface 3104 of the door 3102. Each of the connection legs 3113 and the light pipe leg 3114 are inserted into one of the openings 3106 in the door 3102 to couple the handle 3110 to the door 3102. Moreover, there are a plurality of intermediate attachment members 3107 that are inserted into the openings 3106 from the rear surface 3104 of the door 3102 to finalize the coupling of the handle 3110 to the door 3102. In the exemplified embodiment, the light pipe leg 3114 has a greater length than each of the connection legs 3113. Thus, the connection legs 3113 do not extend through the full thickness of the door 3102, but the light pipe leg 3114 may extend through the full thickness of the door 3102. This ensures that the distal end 3115 of the light pipe leg 3114 is positioned as close as possible to the illumination source 3130 to maximize the transfer of light therethrough.

Figure 18:
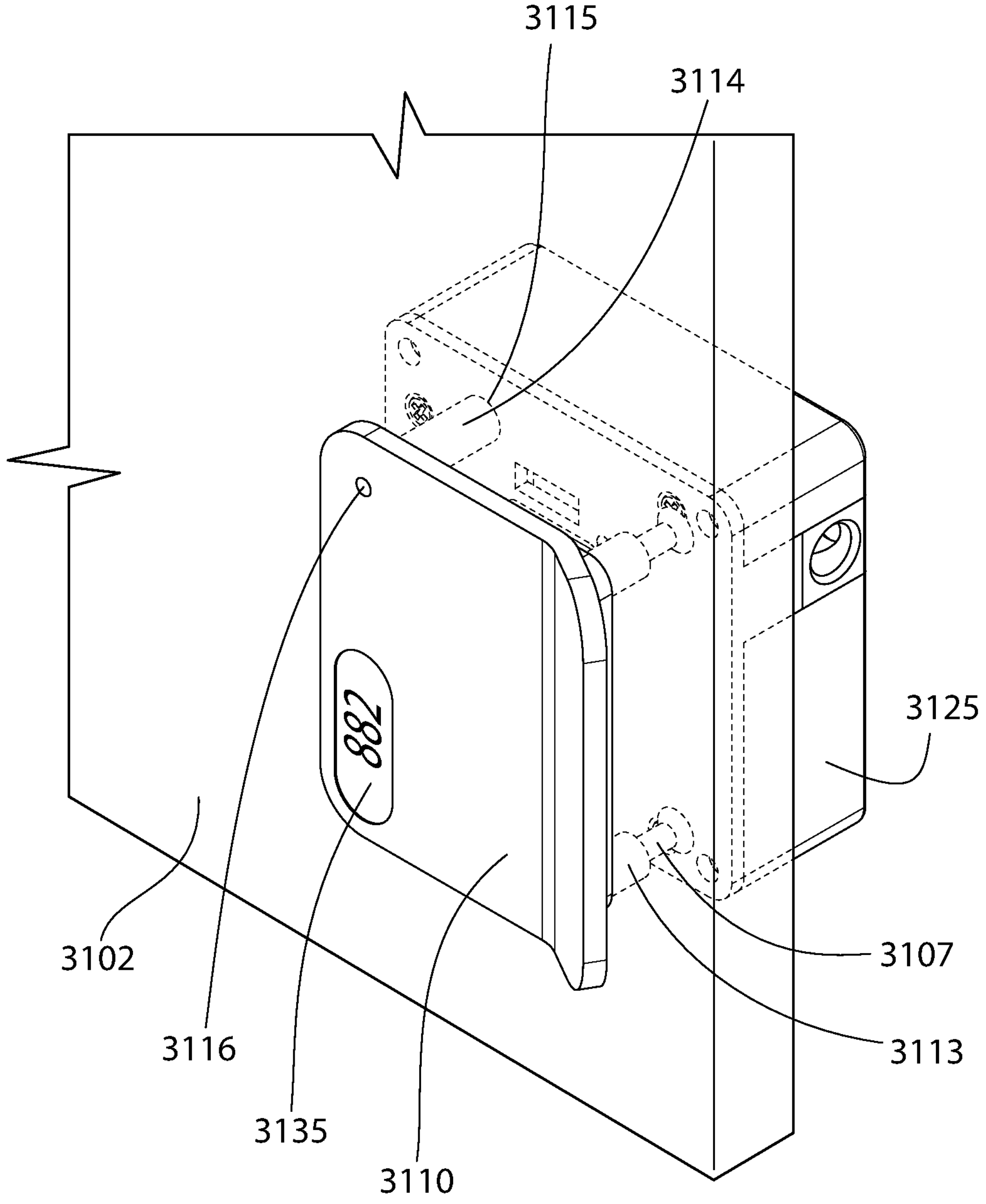
FIG. 18 is a perspective view illustrating the handle and the first component of the locking mechanism coupled to the door of the storage apparatus of FIG. 13.

FIG. 18 illustrates both the handle 3110 and the actuator housing 3125 coupled to the door 3102. The handle 3110 is located on one side of the door and the actuator housing 3125 is located on the opposite side of the door 3102. The handle 3110 may be coupled to the actuator housing 3125 via the intermediate attachment members 3107. The distal end 3115 of the lightpipe leg 3114 is positioned either in abutting contact with or very close to the actuator housing 3125. Furthermore, the passageway of the lightpipe leg 3115 is aligned with the illumination source 3130 to ensure that light emitted from the illumination source 3130 passes through the passageway of the lightpipe leg 3115 and to the opening 3116 in the front surface of the handle 3110. The opening 3116 in the front surface of the handle 3110 may be closed by the light pipe element 3118. Moreover, in this embodiment there is a label 3135 placed onto the front surface of the handle 3110 with a numerical identifier for the storage cavity associated with the handle 3110.

Referring to FIG. 14, the storage apparatus 3000 functions slightly differently than the storage apparatuses 1000, 2000 previously described, with specific reference to the operation of the various indicator components. In the storage apparatuses 1000, 2000, the indicator components 160, 2160 were electronic paper that could display two different visual displays depending in whether the lock mechanism 120, 2120 was in the locked state or the unlocked state. In the storage apparatus 3000, the illumination element 3130 emits a light at various times during the locking/unlocking sequence.

In one embodiment, upon a user presenting the credential device 3400 to a region associated with one of the storage cavities (which could be the handle 3110 or any region near or along the door 3102), the illumination element 3130 may flash a single time, with the flash being seen through the opening 3116 in the handle 3110. In other embodiments, the illumination element 3130 may flash multiple times within a predetermined period of time, such as within a five second period of time. The illumination element 3130 may flash in different colors to indicate different scenarios to the user. For example, the illumination element 3130 may flash red if the storage cavity the user is attempting to access is already being used by another person. The illumination element 3130 may flash green if a user is granted access to the storage cavity. The illumination element 3130 may flash only when being presented with the credential device 3400. Specifically, the illumination element 3130 may flash only when the reader component has received credential data from the credential device 3400. In other embodiments, the illumination element 3130 may flash periodically simply to provide a user with a status indication even without the user attempting to gain access. However, there is a desire to minimize the amount of power used by the illumination element 3130 since it is powered by a power source such as a battery that is housed in the actuator housing 3125. Thus, to prevent the need to change the power source too frequently, there is a desire to limit the length of each flash and the number of flashes that occur over time. This is why in one embodiment the illumination element 3130 may only flash when a user is attempting to gain access to a particular storage cavity, as described herein, rather than the illumination element 3130 being continuously or contently illuminated, which would quickly drain the battery and render the system inoperable. This is particularly true where the same power source is used to power the illumination element 3130 and the lock mechanism 3120.

In each embodiment described herein, the electronic components are operably coupled together in the required manner to render the system operable. That is, the reader component, illumination element, indicator component, and locking mechanism are operably coupled to a power source which is configured to supply power either constantly or intermittently thereto. Moreover, there may also be a controller that is also operably coupled to the power source and the various other electronic components to facilitate proper functioning of the electronics assembly. The locking mechanism is also operably coupled to the power source and possibly also the controller to control the transitioning of the locking mechanism between the locked and unlocked states. The locking mechanism is electronically and automatically operated and does not require a user to manually insert a key. Rather, the reader component initiates operation of the locking mechanism once it receives authenticated credential data as described herein.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A storage apparatus comprising:

a housing comprising a storage cavity having an opening;

a door coupled to the housing and alterable between a closed state whereby the door closes the opening of the storage cavity and an open state whereby the opening of the storage cavity is exposed to provide a user with access into the storage cavity;

a handle coupled to the door and configured for engagement with a user's hand to facilitate opening and closing of the door, the handle comprising a handle cavity and a window providing visual access into the handle cavity;

a locking system comprising:

an electronics assembly comprising a reader component and an indicator component that are located within the handle cavity, the indicator component being visible through the window of the handle and being alterable between a first display state and a second display state; and a locking mechanism in operable communication with the electronics assembly, the locking mechanism alterable between a locked state whereby the door is prevented from being altered from the closed state to the open state and an unlocked state whereby the door is permitted to be altered between the open and closed states;

wherein upon the reader component receiving credential data and the electronics assembly authenticating the credential data, the locking system is transitioned between: (1) a locked configuration whereby the locking mechanism is in the locked state and the indicator component is in the first display state; and (2) an unlocked configuration whereby the locking mechanism is in the unlocked state and the indicator component is in the second display state;

wherein the indicator component comprises electronic paper having a background region and an identifier region which displays a number associated with the storage apparatus, the background region and the number being displayed as different colors; and wherein a color of the background region changes when the indicator component is altered between the first display state and the second display state.

2. The storage apparatus according to claim 1 wherein the handle is a pull handle that is fixed and non-movable relative to the door.

3. The storage apparatus according to claim 1 wherein the handle comprises a first handle component and a second handle component that are coupled together to define the handle cavity, the first handle component comprising one or more coupling elements for attaching the handle to the door, the second handle component comprising the window through which the indicator component is visible.

4. The storage apparatus according to claim 1 wherein the electronic paper of the indicator component maintains the first display state or the second display state without consuming any power, the indicator component only consuming power when transitioning between the first and second display states.

5. The storage apparatus according to claim 1 wherein when the indicator component is in the first display state the background color is displayed as a first color and the number is displayed as a second color, and when the indicator component is in the second display state the background color is displayed as a third color and the number is displayed as a fourth color, the first and second colors being different from one another, and the third and fourth colors being different from one another.

6. The storage apparatus according to claim 1 wherein the indicator component further comprises a status region, and wherein when the indicator component is in the first display state an icon is visible within the status region and when the indicator component is in the second display state the icon is not visible within the status region.

7. The storage apparatus according to claim 1 wherein the window comprises:

an aperture extending from a front surface of the handle to the handle cavity; and a cover coupled to the handle and covering the aperture, the cover comprising a transparent portion, and wherein the indicator component is visible through the aperture and the transparent portion of the cover.

8. The storage apparatus according to claim 1 wherein the handle comprises a gripping portion extending along a handle axis that is oblique to a front surface of the door, wherein the gripping portion extends from a first end to a second end along the handle axis, the first end being positioned closer to the front surface of the door than the second end so that a user is configured to engage an underside of the gripping portion of the handle to alter the door from the closed state to the open state.

9. The storage apparatus according to claim 1 wherein the locking system further comprises a power source that supplies power to the indicator component and to the locking mechanism each time the credential data is authenticated by the electronics assembly, the power source otherwise not supplying power to the indicator component or the locking mechanism, wherein the power source supplies power to the indicator component to transition the indicator component between the first and second display states and to the locking mechanism to alter the locking mechanism between the locked and unlocked states each time that credential data is presented to the reader component and authenticated by the electronics assembly.

10. A storage apparatus comprising:

a housing comprising a storage cavity;

a door coupled to the housing and configured to close the storage cavity, the door comprising a plurality of apertures that extend from a front surface thereof to a rear surface thereof;

a handle comprising a front surface, a rear surface, a plurality of connection legs protruding from the rear surface, and a lightpipe leg protruding from the rear surface, the lightpipe leg defining a passageway that extends from a distal end of the lightpipe leg to an opening in the front surface of the handle, each of the plurality of connection legs and the lightpipe leg, respectively, extending into one of the plurality of apertures in the door to facilitate coupling the handle to the door;

a locking mechanism comprising a first component coupled to the rear surface of the door and a second component coupled to a sidewall of the housing within the storage cavity, the first component comprising a housing and an illumination element, the illumination element aligned with the passageway of the lightpipe leg of the handle, the locking mechanism alterable between a locked state whereby a first locking feature of the first component engages a second locking feature of the second component and an unlocked state whereby the first and second locking features are not engaged;

a reader component configured to receive credential data; and wherein upon the reader component receiving credential data and the credential data being authenticated, the illumination element flashes one or more times within a predetermined time period and the locking mechanism is either altered from the locked state to the unlocked state or from the unlocked state to the locked state.

11. The storage apparatus according to claim 10 further comprising a light pipe element disposed within the passageway of the lightpipe leg for transmitting light illuminated from the illumination element to the opening in the front surface of the handle.

12. The storage apparatus according to claim 10 wherein each of the connection legs has a first length measured from the rear surface of the handle to a distal end of the connection leg and wherein the lightpipe leg has a second length measured from the rear surface of the handle to the distal end of the lightpipe leg, the second length being greater than the first length, wherein the distal ends of the connection legs are spaced apart from the housing of the first component of the locking mechanism and wherein the distal end of the lightpipe leg is in contact with the housing of the first component of the locking mechanism, and wherein each of the connection legs is indirectly coupled to the housing of the first component of the locking mechanism with an intermediate attachment member.

13. The storage apparatus according to claim 10 further comprising a power source located in the housing of the first component of the locking mechanism, and wherein the power source supplies power to the illumination element and to the locking mechanism each time the credential data is authenticated, and wherein the reader component is housed within the housing of the first component of the locking mechanism.

* * * * *